US012671094B2

(12) United States Patent
Wang

(10) Patent No.: US 12,671,094 B2
(45) Date of Patent: Jun. 30, 2026

(54) CARBON FIBER AND GRAPHENE COMPOUNDED HIGH-STRENGTH POROUS MATERIAL, AND GAS DIFFUSION LAYER AND PREPARATION METHOD THEREFOR

(71) Applicant: ANHUI UNIVERSITY, Hefei (CN)

(72) Inventor: Junzhong Wang, Hefei (CN)

(73) Assignee: ANHUI UNIVERSITY, Hefei (CN)

( * ) Notice: Subject to any disclaimer, the term of this patent is extended or adjusted under 35 U.S.C. 154(b) by 490 days.

(21) Appl. No.: 18/282,791

(22) PCT Filed: Jul. 20, 2022

(86) PCT No.: PCT/CN2022/106789
§ 371 (c)(1),
(2) Date: Sep. 19, 2023

(87) PCT Pub. No.: WO2023/024770
PCT Pub. Date: Mar. 2, 2023

(65) Prior Publication Data
US 2024/0170683 A1 May 23, 2024

(30) Foreign Application Priority Data
Aug. 23, 2021 (CN) .......................... 202110970965.3

(51) Int. Cl.
H01M 4/88 (2006.01)
H01M 4/86 (2006.01)
H01M 4/96 (2006.01)

(52) U.S. Cl.
CPC ....... *H01M 4/8807* (2013.01); *H01M 4/8605* (2013.01); *H01M 4/8846* (2013.01); *H01M 4/886* (2013.01); *H01M 4/96* (2013.01)

(58) Field of Classification Search
CPC ............ H01M 4/8807; H01M 4/8605; H01M 4/8846; H01M 4/886; H01M 4/96; H01M 2008/1095; H01M 8/0234; H01M 8/0245
See application file for complete search history.

(56) References Cited

U.S. PATENT DOCUMENTS

2014/0011118 A1   1/2014   Lee et al.
2015/0372332 A1 * 12/2015   Okano ................ H01M 8/0241
                                                                      429/534
2016/0329586 A1   11/2016   Ninan et al.

FOREIGN PATENT DOCUMENTS

CN   103693638 A   4/2014
CN   104981929 A   10/2015
(Continued)

*Primary Examiner* — Matthew T Martin
*Assistant Examiner* — Ankith R Sripathi
(74) *Attorney, Agent, or Firm* — Bayramoglu Law Offices LLC

(57) ABSTRACT

A carbon fiber and graphene compounded high-strength porous material, and a gas diffusion layer and a preparation method therefor are provided. The carbon material integrates respective structures and characteristic advantages of a carbon fiber and graphene, complements each other, and has characteristics such as high mechanical strength (the carbon fiber is not cut off), hierarchical pore gradient distribution, good air permeability, good electric conductivity, good thermal conductivity, light weight, and high stability. The preparation method includes process steps such as graphene preparation, filament split of a carbon fiber bundle by spreading a liquid film, adsorption and anchoring of a filament by means of graphene, graphene coating, and high-temperature treatment. In the preparation process of the carbon-based gas diffusion layer, the carbon fiber is not cut off, the strength of the carbon fiber is kept, and the carbon-based gas diffusion layer is suitable for roll-to-roll batch preparation.

9 Claims, 2 Drawing Sheets

(56)          References Cited

FOREIGN PATENT DOCUMENTS

| | | | |
|----|------------|----|---------|
| CN | 105384164  | A  | 3/2016  |
| CN | 106409525  | A  | 2/2017  |
| CN | 107230814  | A  | 10/2017 |
| CN | 113809336  | A  | 12/2021 |

* cited by examiner

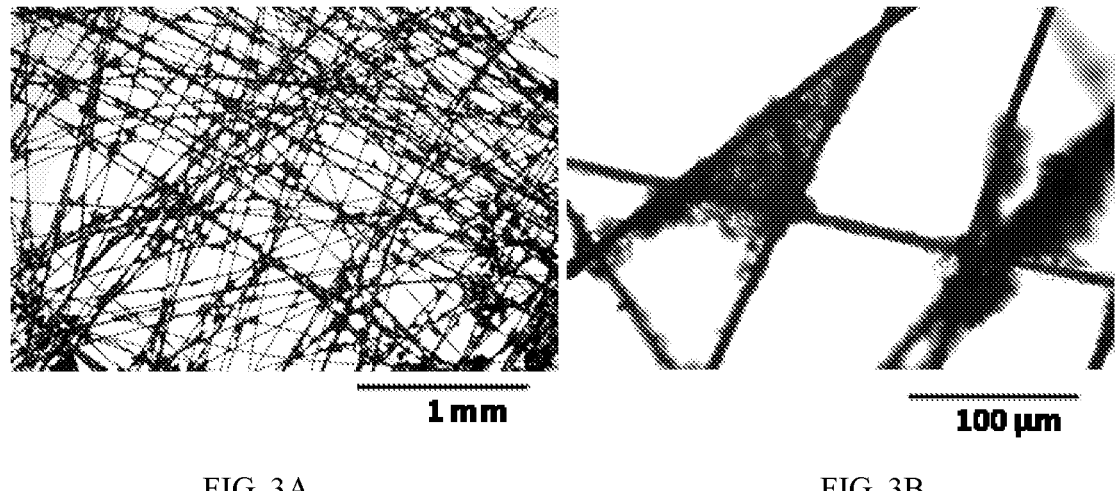
FIG. 3A                                                          FIG. 3B
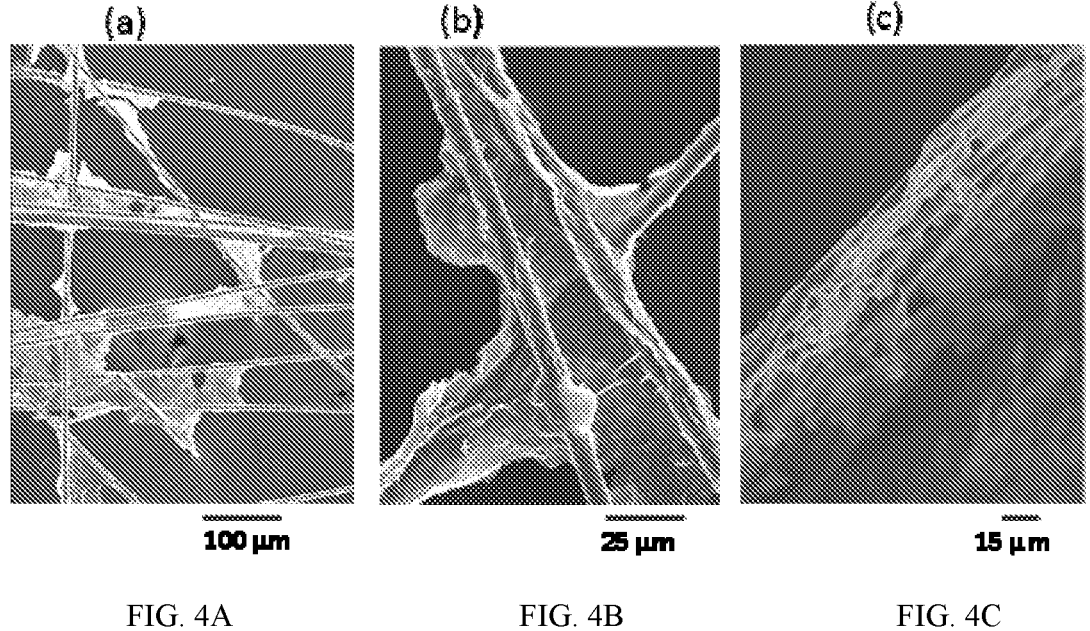
FIG. 4A                          FIG. 4B                          FIG. 4C

CARBON FIBER AND GRAPHENE COMPOUNDED HIGH-STRENGTH POROUS MATERIAL, AND GAS DIFFUSION LAYER AND PREPARATION METHOD THEREFOR

CROSS REFERENCE TO THE RELATED APPLICATIONS

This application is the national phase entry of International Application No. PCT/CN2022/106789, filed on Jul. 20, 2022, which is based upon and claims priority to Chinese Patent Application No. 202110970965.3, filed on Aug. 23, 2021, the entire contents of which are incorporated herein by reference.

TECHNICAL FIELD

The present invention relates to a carbon fiber and graphene compounded high-strength porous material, and a gas diffusion layer and a preparation method therefor, and belongs to the fields of inorganic non-metallic materials and fuel cells.

BACKGROUND

In the field of energy and environment, a gas diffusion layer (GDL for short) plays an important role. The gas diffusion layer is required for preparing the hydrogen (called green hydrogen) by electrolyzing water and achieving low-carbon clean energy. GDL is also required for fuel cells and the electrical reduction of cathode oxygen to water. GDL is also required for the electro-catalytic conversion utilization of carbon dioxide $CO_2$. Catalysts require specificity, precision, and limitation in a specific reaction application. However, GDL is a universal support catalyst, a frontier for achieving electronic and chemical reactions, and a common key material.

The key materials and technologies matched with fuel cells are the foundation for hydrogen energy utilization and economic development. The market for fuel cells in fields such as automobiles, trucks, forklifts, ships, submarines, and military power supplies is rapidly increasing. According to the White Paper on China's Hydrogen Energy and Fuel Cell Industry, it is predicted that the yield of the hydrogen energy and the fuel cells is estimated to exceed 10 trillion yuan by 2050. In September 2020, China issued a notice on the demonstration of fuel cell vehicles, and proposes policies to vigorously promote the fuel cells and related new energy vehicle industry.

The gas diffusion layer GDL is an important component of proton exchange membrane fuel cells. GDL has functions of supporting a catalyst, collecting current, and supplying and transferring electrons, and also bears the transmission channels of gas, electrolyte, heat energy, and the like of electrochemical reactions of the electrode. GDL has high requirements for application performances, including good mass transfer, heat transfer, electric conductivity, high air permeability, good mechanical strength, capability of supporting multi-phase and multi-dimensional reactions and mass energy transmission.

There are generally four types of GDLs, carbon paper (composed of a chopped carbon fiber as the main basis), carbon fiber woven cloth (that is woven by carbon fiber bundles and is thick, strong, and soft), non-woven fabric (usually made of polymer materials carbonized and converted), and carbon black paper (prepared by assembling and bonding carbon black particles). Since the thickness of the carbon paper can be adjusted within a certain range compared with that of other types of GDLs, the carbon paper can be thinner, has a smooth surface, can resist corrosion, has high porosity and a relatively mature manufacturing process, and has been commercially verified to be a mainstream product.

The process lines for preparing the carbon paper are generally as follows: a carbon fiber is chopped into millimeter-centimeter short carbon fiber filaments, a slurry is prepared by a polymer and a binder, and after coating and shaping, a support layer is formed through high temperature carbonization and graphitization and other processes. Then a microporous layer is coated, and surface hydrophobic treatment and other process steps are performed. Although carbon paper has undergone commercial validation, it also has significant disadvantages: the carbon fiber loses long-range mechanical strength after chopped, carbon paper products have high brittleness, and the electric conductivity and the thermal conductivity of the carbon paper product are not high enough. For example, advanced carbon paper products from a company in Japan have a thickness of 0.19 mm, a tensile strength of 50 MPa, and a thermal conductivity coefficient of about 10 W/m·K. In short, the performance of the gas diffusion layer based on chopped carbon fiber is almost limited and it is difficult to greatly improve.

In theory, graphene is a carbon fiber basis, which is generally believed to have been found in 2004, much later than carbon fibers. Graphene is a true two-dimensional atomic crystal in that carbon atoms are bonded by sp2 hybrid chemical bonds and are tightly packed into a hexagonal honeycomb lattice. Graphene integrates top thermal conductivity, electric conductivity, flexibility, and chemical stability. Graphene has advantages over carbon black in performance, including better resistance to electrochemical corrosion, better electric conductivity, and better thermal conductivity. Graphene is a two-dimensional microscopic material with atomic thickness. The inventor's team has reported that a graphene-carbon fiber-activated carbon compounded high-strength electrode material prepared by using an electrolysis method to assist the carbon fiber to spread the monofilament, and this material has properties of supercapacitor carbon and high mechanical strength (Chinese Patent Application No. CN201610886809.8; Carbon, 126 (2018), pp 500-506).

SUMMARY

The present invention first develops a technical study after recognizing the advancement of the scientific principles of a graphene-carbon fiber-based gas diffusion layer. Carbon fiber is a classical high-strength fiber material, and the original tensile strength of the carbon fiber filament is very high (5500 MPa), and is almost higher than that of carbon paper (50 MPa) by 2 orders of magnitude. However, carbon paper loses its strength advantage because the fiber thereof is cut into millimeter short fibers. The mechanical strength of the carbon paper is mainly dependent on the adhesion of amorphous carbon obtained after carbonization of the binder polymer to the chopped carbon fibers. The graphene has significant advantages in terms of thermal conductivity, electric conductivity, and mechanical strength compared with binder-converted amorphous carbon. It is known that graphene is a two-dimensional carbon atom crystal, has almost the highest theoretical mechanical strength and almost the best flexibility, and is the best known material for thermal conductivity (theoretical thermal conductivity coefficient of 5300 W/m·K). The interface bonding of the graphene and the carbon fiber belongs to the interface bonding of carbon element materials, and the ohmic contact should be easier to form. Carbonizing, carbon-nitrogen bonding, and performing graphitization high-temperature treatment including high-temperature treatment at a temperature of greater than or equal to 2000° C. should synchronously improve the electric conductivity, thermal conductivity, and binding force of a carbon fiber and graphene. Compared with carbon paper, the advantages of uncut carbon fiber filaments to chopped carbon fiber filaments and the advantages of graphene to amorphous carbon are significant in the two structural units, so that the advantages of intrinsic material characteristics such as mechanical strength, thermal conductivity, and electric conductivity of the gas diffusion layer are improved. The mechanical strength of the gas diffusion layer (GDL for short) is improved, and the thickness reduction of the GDL becomes possible. Therefore, the graphene-carbon fiber-based high-strength gas diffusion layer (gas diffusion hierarchical porous material) has theoretical advancement in structure.

In view of this, one of the objectives of the present invention is to provide a carbon fiber and graphene compounded high-strength porous material, and a gas diffusion layer and a preparation method therefor. The present invention takes the performance advantages of graphene into consideration, uses a new technical route and a new technological method aiming at the limitation of GDL, and prepares a carbon fiber-graphene compounded air-permeable hierarchical-pore high-electric-conductivity thermal-conductivity high-strength carbon material. The present invention uses a commercial mesh film (such as a polymer material and a metal material) as a base film, supports commercial carbon fiber bundles to split into and spread filaments under the action of liquid film stretching, use graphene to solidify carbon fibers and assemble them into an air-permeable layer, and prepares a high-strength composite gas diffusion support layer with a carbon fiber-graphene compounded air-permeable gradient pore layer having an adjustable thickness.

The present invention adopts the following technical solutions.

The present invention provides a gas diffusion layer formed by combining a carbon fiber and graphene, which comprises a porous and air-permeable conductive carbon material layer formed by compounding a carbon fiber monofilament (with a diameter of 5-7 micrometers) with graphene and having a porosity of greater than or equal to 70%. The conductive carbon material layer comprises a support layer and a microporous layer on the support layer. The support layer may or may not be in contact with the microporous layer. The gas diffusion layer supports catalytic reaction of catalyst and involved gas (such as oxygen, hydrogen, nitrogen, and carbon dioxide), supports gas-liquid-electricity transmission, has better performance than commercial carbon paper, and is applied to the aspects of fuel cells, metal-air cells, water electrolysis, and the like.

In an embodiment of the present invention, the support layer comprises a porous material layer formed by compounding a carbon fiber monofilament with large graphene, wherein the large graphene is of 1-5 graphene atomic layers, and single nanosheet graphene has an area greater than 50 square micrometers.

In an embodiment of the present invention, the carbon fiber monofilaments have a diameter of 5-7 micrometers and a length greater than 10 centimeters.

The present invention provides a preparation method for graphene used for preparing a gas diffusion layer, wherein the graphene comprises large graphene, large nanosheet graphene, small graphene, and graphene with a void; the large graphene is of 1-4 graphene atomic layers, and single-sheet graphene has an area greater than 100 square micrometers; the large nanosheet graphene is of 1-6 graphene atomic layers, and single-sheet graphene has a length greater than or equal to 10 micrometers and a width greater than or equal to 5 micrometers; the small graphene is of 1-9 graphene atomic layers, and single-sheet graphene has a length and a width that all are less than 1 micrometer; and the graphene with the void is provided with a void with a size of 1-300 nanometers on a surface of single-sheet graphene, and the size of the nanosheet is not limited.

The large graphene further has a technical feature that the content of carbon element is greater than or equal to 88 wt %, has the crystal characteristics (the electron diffraction pattern in a transmission electron microscope is lattice and not ring), also has an oxygen-containing chemical functional group and a carbon-oxygen-hydrogen-containing solid electrolyte interface, and can be dispersed in water, alcohol, and dimethylformamide DMF to form a slurry; and the slurry is sprayed to form a film and a coating and is self-absorbed to form a film after dried.

In an embodiment of the present invention, the large graphene is of 1-5 graphene atomic layers, and single nanosheet graphene has an area greater than 50 square micrometers; the small graphene is of 1-9 graphene atomic layers, and a length and a width of a single sheet of the small graphene are less than 1 micrometer; and the graphene with the void is provided with a void with a size of 1-300 nanometers on a surface of single-sheet graphene.

The present invention provides different preparation methods for different types of graphene required by gas diffusion layer preparation, which comprise a preparation method for large graphene by taking a large graphite grain as a raw material, a preparation method for small graphene by taking ultrafine graphite and earthy graphite as raw materials, and a preparation method for graphene with a void.

The present invention provides a gas diffusion layer which is compounded by a carbon fiber filament and graphene and has layered gradient pore distribution, wherein the gas diffusion layer has a layered network air-permeable structure with pore diameters in gradient distribution, the pore diameters are in layered gradient distribution from millimeter (1-2 mm) to micrometer (1-500 micrometers) to nanometer (1-300 nm), the millimeter and micrometer pores are formed by compounding carbon fiber filaments and graphene, the nanometer pores are formed by graphene, a distance between the carbon fiber filaments and a density of the carbon fiber filament are in layered gradient distribution, a surface density of each layer of carbon fiber monofilaments ranges from 20 monofilaments to 500 monofilaments per square centimeter, and a surface density between layers is arranged unidirectionally from high to low.

The present invention provides a graphene-carbon fiber porous material for a gas diffusion layer, wherein the carbon element is greater than or equal to 70 wt % (mass ratio), the sum of carbon and nitrogen is greater than or equal to 90 wt %, the ratio (mass ratio) of carbon fiber to graphene is 5-2, and the air permeability is greater than or equal to 70%; the support layer is formed by compounding a carbon fiber and large nanosheet graphene (the large nanosheet graphene is defined as that a graphene nanosheet has a length greater than 10 micrometers and a width greater than 8 micrometers, and the graphene is of 1-6 atomic layers), the large nanosheet graphene is located at the intersection point of carbon fiber filaments or adjacent filaments, the carbon fiber filaments are cross-overlapped, and the graphene is connected to the filaments; the carbon fiber filament-graphene support layer is provided with gradient pores, the pore diameter is gradually reduced, the surface density of the single-layer carbon fiber filament is arranged unidirectionally from large to small, and the schematic diagram of the gradient pores is shown in FIG. 1.

The present invention provides a porous support layer of a gas diffusion layer compounded by a carbon fiber and graphene, the graphene adsorbs rivet carbon fiber filaments, and the intersection points of the filaments cover the graphene to form a porous frame structure. The schematic diagram of the single-layer support layer of the gas diffusion layer combined by graphene-carbon fiber filament is shown in FIG. 2, wherein the graphene is located at the intersection point (junction) of the carbon fiber filaments.

The support layer of the gas diffusion layer compounded by a carbon fiber and graphene has a thickness less than or equal to 100 micrometers, a tensile strength greater than or equal to 100 Mpa, and a porosity greater than or equal to 70%, and can be stretched roll-to-roll and transported in rolls.

The present invention further provides a thermal-conducting and electric-conducting carbon material combined by graphene and a carbon fiber filament, which comprises a porous material layer formed by compounding the carbon fiber filament with the graphene, wherein the carbon material has a parallel thermal conductivity greater than or equal to 50 W/(m·K), a parallel resistivity less than or equal to 2 mΩ·cm, and a tensile strength greater than or equal to 120 Mpa, and the mass ratio of the graphene to the carbon fiber is 1-3. Preferably, the carbon material has a parallel thermal conductivity greater than or equal to 100 W/(m·K).

The present invention provides a microporous layer of a gas diffusion layer (a schematic diagram thereof is shown in FIG. 1b), wherein the microporous layer has a thickness less than 20 micrometers and is composed of graphene, the graphene comprises small graphene and graphene with a void, and a proportion of the graphene with the void is greater than or equal to 70 wt %; the small graphene is characterized by 1-9 atomic layers, and a two-dimensional nanosheet has an area less than 1 square micrometer; the graphene with the void is characterized in that the void is formed in the graphene nanosheet (the size of the nanosheet is not limited), and each void has an area of 2 square nanometers to 1 square micrometer.

The preparation method for the gas diffusion layer comprises the step of using a driving force, wherein the interfacial force of the liquid and the carbon fiber filaments drives the carbon fiber bundle to be split and spread to form a network filament layer, and the area of the network filament layer is enlarged by more than 20 times relative to that the carbon fiber tows.

The preparation method for the gas diffusion layer comprises a method for changing a commercial tow into single filaments which are arranged in a large area, namely a liquid film method. The present invention comprises a method for splitting a fiber tow into filaments, wherein the tow is split into filaments by spreading a liquid film to form a liquid film for infiltrating the filaments, the filaments and filaments form a network infiltrated and covered by the liquid film, and an area of the liquid film is enlarged to more than 10 times relative to that of the tow.

The present invention provides a preparation method for large graphene, which comprises the following steps: (1) taking a graphite paper as an electrode, or taking a graphite film prepared from vermicular graphite as an electrode, wherein a single electrode has a thickness of 0.5-2 mm; cutting the graphite paper or the graphite film into comb-shaped strips, wherein each strip has a width of 1-3 cm; (2) electrifying by using the electrolyte to drive the graphite to expand; (3) performing electrifying under conditions that the voltage of a direct current power supply is charged for 3-8 V, the temperature is 0-40° C., standing for discharging is performed, a software program controls a current to be positive current, standing, and reverse current which are alternately performed; (4) performing filter pressing after electrolysis, and recovering electrolyte for recycling the electrolytic graphite paper/film; then soaking and stirring with alkaline aqueous solution (sodium hydroxide/lithium aqueous solution, hydroxyl ion has a concentration of 5-30 wt %), filtering, stirring, washing, and washing with water to pH of 8-10; and (5) performing ultrasonic dispersion, wherein the dispersion concentration of graphene in water is 1-3 mg/L, and performing ultrasonic treatment for 0.5-1 h.

The electrolyte used for preparing the large graphene comprises perchlorate ions at a concentration of 5-10 wt % and lithium ions at a concentration of 1-5 wt %, the solvent comprises dimethyl carbonate (DMC) and water, the content of the water is 0.02 wt % to 2 wt %, and the content of the DMC is greater than or equal to 50 wt %; and the solvent further comprises at least one of ethylene carbonate (EC), diethyl carbonate (DEC), and ethyl methyl carbonate (EMC).

The large graphene provided by the present invention has a crystal characteristic and a carbon element content greater than or equal to 88 wt %, has an oxygen-containing chemical functional group and a carbon-oxygen-hydrogen-containing solid electrolyte interface, and can be dispersed in water, alcohol, and dimethylformamide DMF to form a slurry; the slurry is sprayed to form a film and a coating and is self-absorbed to form a film after dried, and the large graphene has a tensile strength greater than or equal to 30 MPa when the graphene film has a thickness of 1-5 micrometers.

The present invention provides a preparation method for large nanosheet graphene, which comprises the following steps: (1) taking a graphite paper as an electrode, or taking a graphite film prepared from vermicular graphite as an electrode, wherein a single electrode has a thickness of 0.5-2 mm; cutting the graphite paper or the graphite film into comb-shaped strips, wherein each strip has a width of 1-3 cm; (2) electrifying by using the electrolyte to drive the graphite to expand; (3) performing electrifying under conditions that the voltage of a direct current power supply is charged for 3-8 V, the temperature is 0-40° C., standing for discharging is performed, a software program controls a current to be positive current, standing, and reverse current which are alternately performed; (4) performing filter pressing after electrolysis, and recovering electrolyte for recycling the electrolytic graphite paper/film; then soaking and stirring with alkaline aqueous solution (sodium hydroxide/lithium aqueous solution, hydroxyl ion has a concentration of 5-30 wt %), filtering, stirring, washing, and washing with water to pH of 8-10; and (5) performing ultrasonic dispersion, wherein the dispersion concentration of graphene in water is 4-6 mg/L, and performing ultrasonic treatment for 3-6 h.

The electrolyte used for preparing the large nanosheet graphene comprises perchlorate ions at a concentration of 5-10 wt % and lithium ions at a concentration of 1-5 wt %, a solvent comprises dimethyl carbonate (DMC), water and perchlorate ionic liquid, wherein the water content is 0.02-2 wt %, the DMC content is greater than or equal to 50 wt %, and the ionic liquid (such as 1,3-dimethylimidazolium perchlorate) content is 0.1-0.5 wt %; and the solvent further comprises at least one of ethylene carbonate (EC), diethyl carbonate (DEC), and ethyl methyl carbonate (EMC).

The present invention provides an ultrathin porous electric-conductivity and thermal-conductivity thin carbon layer combined by a carbon fiber filament and graphene, which has a thickness less than or equal to 20 micrometers, a porosity greater than or equal to 70%, a tensile strength greater than or equal to 200 Mpa, and a parallel thermal conductivity greater than or equal to 20 W/(m·K). Such carbon layers are referred to as "monofilament layers".

The present invention provides a combination mode of a graphene-carbon fiber filament compounded monofilament layer, which comprises the following steps: supporting a monofilament layer by a base film, performing cross-overlapping, removing the base film, spraying large graphene slurry, and then performing mechanical pressing and high-temperature treatment.

The present invention provides a method for splitting a fiber tow into filaments, wherein the tow is split into filaments by spreading a liquid film to form a liquid film for infiltrating the filaments (a filament-liquid film for short), the filaments and filaments form a network infiltrated and covered by the liquid film, and an area of the filament-liquid film is enlarged to more than 10 times relative to that of the tow. The width of the filament-liquid film may extend from 1 cm to greater than or equal to 3 m.

The present invention provides a method for splitting a tow into monofilaments, which is named a filament-film method and can be used in a liquid film method for separating tows containing carbon fiber filaments and other materials (polyurethane and nylon), wherein the oxygen-containing hydrophilic functional groups on the surface of the tow form a liquid film with the aqueous solution; the film surface of the filament-liquid film is in contact with air on both sides, and the liquid film has a thickness of 0.5-50 micrometers and a viscosity of 1.7-1000 Pa·s. The liquid film comprises the following components: 0-4 of sodium carboxymethyl cellulose, polyvinyl alcohol, polyacrylic acid, and waterborne polyurethane, and also comprises carbon fiber filaments (or filaments of other materials); the filament-liquid film can extend and enlarge the area by more than 10 times, can receive the liquid to expand the area of the liquid film, and a distance between the filaments can be synchronously increased along with the expansion of the area of the liquid film.

The present invention provides a preparation method for a solid-liquid film, which comprises the following steps: (1) preparing a solution, wherein components of the solution comprise polymers, the total concentration of the polymers is 0.1-5% (the solvent is water), and the polymers are 0-4 of sodium carboxymethyl cellulose, polyvinyl alcohol, polyacrylic acid, and waterborne polyurethane; (2) performing oxidation hydrophilicity of carbon fiber bundles, removing a sizing agent, and then performing heat oxidation or electrochemical oxidation in concentrated nitric acid; (3) soaking hydrophilic carbon fiber bundles in the solution to filtrate the carbon fiber bundle filament in the solution, wherein at least one end of the carbon fiber bundle is fixed; and (4) stretching the carbon fiber bundles towards two sides at a controlled speed, supplying the solution to the liquid film, and keeping the area of the liquid film from being broken during the increase.

The present invention provides a preparation method for graphene with a void, and in particular a method for voiding a graphene nanosheet, which comprises the following steps: preparing an aqueous solution of metal ions, adding small graphene to form a small graphene dispersion; then drying the dispersion, then putting the solid into a furnace for heating, introducing 5% of argon with hydrogen $H_2$, heating at a rate of 10° C./min to 900° C., and keeping this temperature for 1 h; then soaking the mixture in 3 wt % of nitric acid solution for 3 h, filtering, centrifuging, washing with water 6 times, collecting a solid, and drying the solid at 80° C.; and the small graphene dispersion is prepared, the dispersion concentration of the small graphene in water is 5 wt % (mass percentage), the concentration of calcium chloride is 0.01 wt %, and the concentration of magnesium chloride is 0.02 wt % relative to the mass of water. The principle of graphene voiding is that metals and their metal oxides react with graphene carbon at the high temperature, new catalytic reactions occur in the presence of hydrogen, and the metal catalyzes the reaction of carbon and hydrogen to form alkane evacuation, leaving voids catalyzed by the metal.

The present invention provides a preparation method for a gas diffusion layer, which is technically characterized by comprising the following process units: (1) preparation of large graphene, (2) filament split of a carbon fiber tow by spreading a liquid film, (3) compounding of a carbon fiber filament with graphene, (4) preparation of a graphene microporous layer, (5) programmed heat treatment, and (6) forming and surface strengthening.

The present invention provides a method for liquid splitting of a carbon fiber bundle, which includes but is not limited to, removing a sizing agent and performing surface oxidation hydrophilic treatment on the carbon fiber bundles (3K, 12K, 24K and other specification of tows), forming a filament-liquid film including the carbon fiber bundles after the carbon fiber bundles contact with the aqueous solution, and wetting each carbon fiber filament by liquid charging and discharging to form strong binding force on the filament surface. The aqueous solution is a polymer solution, and comprises aqueous solutions of sodium carboxymethyl cellulose, waterborne polyurethane, waterborne polyvinyl alcohol, waterborne polyacrylic acid, and the like, the polymer comprises at least one of the above polymers, and the concentration of the polymer solution is 0.01-10% (mass percentage). The speed and the fineness of the water mist of the water drops are controlled, and a continuous liquid film can still be formed when the carbon fiber bundles are split. Bidirectional stretching is performed on two sides of the carbon fiber bundle, forming a water film between the filaments, and the stretching is slowly performed to extend a width of the water film. The stretched carbon fiber filaments are supported by the water-permeable base film, and a graphene slurry is sprayed and dried. A distance between filaments, the pore diameter of filament crossing, and the surface density of the filaments are controlled by the ratio of the area of the liquid film for infiltrating the carbon fiber filaments to the number of the filaments in the bundle. The width of the water film including the carbon fiber filaments is 0.3 m to 3 m, and the surface density of the filaments is adjusted according to the number of the tows and the area required to be adjusted.

The present invention provides a method for compounding a carbon fiber filament with graphene, which comprises the following procedures: spraying a slurry (with a dispersion concentration of 0.1-6% by mass) of large graphene, drying, cross-overlapping and compacting two rolls of filament films, and the like. The large (nanosheet) graphene slurry is sprayed and dried, filament films are cross-overlapped and compacted, two rolls of filament films are cross-overlapped and compacted, after a base film is removed, and the large (nanosheet) graphene slurry is blew and sprayed, dried and dehydrated to form cross three-dimensional graphene solidified filaments, thus forming a porous frame structure of the graphene adsorption rivet carbon fiber filaments. The combination mode of a carbon fiber and graphene comprises that graphene is adsorbed on the surface of carbon fiber and adsorbed on a surface that is close to the carbon fiber filament simultaneously, the graphene is coated on the carbon fiber filament, graphene is self-absorbed to form a film and then connected, the carbon fiber filaments penetrate through the connection in the graphene aerogel form, and the like. The thickness of a film connected by the graphene film of the solidified filaments is 0.01-15 micrometers.

The step (3) of compounding a carbon fiber filament with graphene in the preparation method for the gas diffusion layer provided by the present invention comprises the following procedures: spraying a slurry (with a dispersion concentration of 0.1-2% by mass) of large graphene, drying, cross-overlapping and compacting two rolls of filament films, and the like.

The step (5) of programmed heat treatment in the preparation method for the gas diffusion layer provided by the present invention comprises: heating at 900-1100° C. for 1-2 h, and heating at 2500±100° C. for 30 min in an argon atmosphere. The ultrahigh temperature graphitization treatment is performed at a temperature greater than or equal to 2000° C., and the oxygen-containing functional groups are removed, so that the electric conductivity, the thermal conductivity, and the mechanical property are improved.

The step (6) of forming and surface strengthening in the preparation method for the gas diffusion layer provided by the present invention comprises: using polyvinylidene fluoride PVDF for improving hydrophobicity and bonding the microporous layer, and performing rolling or hot pressing (at 8-10 MPa).

The preparation method for the air-permeable porous material of graphene and carbon fiber and the support layer of GDL comprises the following steps: treating the surface of a tow of a carbon fiber bundle roll, flatly placing the tow and a liquid-permeable net film, splitting a carbon fiber bundle into filaments by spreading a liquid film and supporting the net film, combining graphene and carbon fiber filaments, rolling and overlapping the filament film, blowing and spraying the graphene and removing the supporting film, performing graphitization high-temperature heat treatment, and forming. The carbon fiber bundle roll is subjected to surface liquid affinity enhancement treatment, for example, a sizing agent on the surface is removed, the roll is soaked in a chemical test solution such as acetone (30 min to 12 h), and the surface of the carbon fiber is heated and oxidized by soaking in concentrated nitric acid to improve hydrophilicity. The liquid-permeable net film includes but is not limited to a metal net film having a pore diameter of 0.05-2 mm, and the liquid-permeable net film can permeate liquid, has a certain tensile strength (greater than or equal to 20 MPa), has a thickness of 0.01-5 mm, and can be removed through solvent dissolution and electrochemical corrosion. The liquid for filament split by the liquid film includes but is not limited to an aqueous solution, and the aqueous solution includes but is not limited to polymer aqueous solutions of hydrophilic carbon fiber filaments, such as 1 wt % to 10 wt % of cellulose and other polymer aqueous solutions having a viscosity of 1.7 to 10000 Pa·S. The carbon fiber bundle is infiltrated and stretched bidirectionally, the liquid flow is uninterrupted, and the flow speed is low. A liquid film soaked by the carbon fiber filaments is formed, wherein the film is kept continuous in the stretching process. The supporting and rolling are performed by the liquid film and a net film, a graphene slurry is added, and the mixture is dried and rolled.

A method for preparing a filament-liquid film including a filament includes, but not limited to, the following steps: (1) preparation of a solution, wherein the components of the solution contain polymers, and the polymers can be dissolved in water or a polar solvent, (2) surface treatment of bundle, so that interface binding force with the solution is improved, and a strong capillary force is formed, (3) the soaking of bundles in the solution, wherein uninterrupted liquid supply is ensured, and flow speed, temperature, humidity and atmosphere are adjusted, and (4) the stretching of tows towards two sides, wherein the continuous filament-liquid film is kept, and the liquid film is not broken and the area is enlarged.

The graphene microporous layer provided by the present invention has the technical characteristics including but not limited to large nanosheet graphene, small-size graphene, and graphene with a void; wherein the large nanosheet graphene is characterized by 1-5 atomic layers, and the two-dimensional nanosheet has an area greater than or equal to 100 square micrometers; the small-size graphene is characterized by 1-9 atomic layers, and the two-dimensional nanosheet has an area of 0.1-1 square micrometer; the void of the graphene has a diameter of 1-500 nanometers; the content of the large nanosheet graphene is 5-10 wt %, the content of the small-sized graphene is 50-60 wt %, and the large and small graphene can contain voids. The preparation of small-sized graphene is based on Patent (a method for preparing graphene by graphite raw ore electrolysis, ZL201410476466.9).

The distribution of pores among layers of the gas diffusion porous material has a gradient and directionality, the porosity also has a gradient (from 90% to 60%), and the surface density of the carbon fiber filaments has the gradient of layers. The thickness of the gas diffusion porous material is related to the number of layers and is controllable, and the thickness is between 10 micrometers and 500 micrometers.

The carbon fiber filaments between single layer of gas diffusion porous material are arranged in a cross mode, large graphene connects the filament layers, and the large graphene forms a micro-film to tie the carbon fiber filaments. The longitudinal connection is formed by blowing large graphene slurry. The concentration of the large graphene slurry is between 0.1 wt % and 2.0 wt %. The blowing speed is 0.1-100 m/s, which is matched with the concentration of the slurry, and the blowing speed is higher when the concentration is high.

In addition, a net film substrate supports and spreads single-layer filaments under the action of a surface liquid film of the carbon fibers, the distance and the density between the carbon fibers and the filaments are adjusted, and the filaments are solidified by utilizing the self-absorption film forming characteristic of graphene; and the spatial distribution of graphene and carbon fiber, the three-dimensional anchoring "bonding" of graphene to carbon fiber, and the distribution trend of pore diameter are adjusted, and the binding force is improved by combining the programmed graphitization high-temperature sintering effect.

The experimental methods such as nanosheet size, etching void-making doping and load modification of graphene are used to adjust arrangement and assembly of carbon fiber filaments, layer pore gradient arrangement, and catalytic active site densification. The strategy of designing stepped pores with decreasing pore diameters in a cross-scale mode is used, and the unidirectional transmission and diffusion of oxygen and water are facilitated from millimeter pores to micrometer pores and then to nanometer pores. The strengthening treatment is performed on the conductive hydrophobicity of the diffusion catalysis thinning layer.

A membrane electrode and a cell of the fuel cell are constructed, the diffusion catalysis performance is measured, and the relationship between the performance of oxygen-water-electricity-heat mass transfer and energy transfer and the structure-activity is inspected. Conventional characterization such as XRD, BET, XPS, and Raman is used for the surface interface composition structure analysis. The diffusion and reduction catalytic performance of oxygen is measured through a series of control samples by using an electrochemical analysis station, a rotating disk electrode, and a fuel cell, which is provided for comparison with commercial Pt/C. The performance parameters of the gas diffusion layer of the present invention and the support layer thereof are analyzed and compared with commercial chopped carbon fiber based carbon paper.

In the present invention, according to the national standard GB/T20042.7-2014, Proton Exchange Membrane Fuel Cells-Part 7: a carbon paper characteristic test method is used to test the performance of the prepared graphene-carbon fiber gas diffusion layer, tests such as thickness uniformity, resistance, mechanical strength, air permeability, porosity, apparent density, surface density, and roughness are performed on the graphene-carbon fiber diffusion layer one by one, and the performance indexes of commercial carbon paper are analyzed and compared.

In the examples of the present invention, a thickness gauge, a length measuring instrument, and a precision electronic balance are used for testing the mass of a sample. The four-probe resistivity tester is used for testing the resistivity of a sample in the plane direction with the precision of ±0.1 mΩ·cm, and the low-resistance tester is used for testing the resistance of the sample in the vertical direction with the precision of ±0.01 mΩ. The mechanical performance testing machine is used for testing the tensile strength and the bending strength of a sample; the mechanical performance testing machine is used for testing the compressive strength of the sample; the densimeter is used for testing the density of the sample with the precision of ±0.002 g/cm$^3$; surface roughness profilometer has the precision of ±0.1 μm; the micro differential pressure gauge is used for testing differential pressure with the precision of ±2 Pa; the micro-regulating valve is used for regulating the air inlet flow, and the precision thereof is ±1% of the full range; and the gas flowmeter is used for measuring the gas flow, and the precision thereof is ±1% of the full range.

The beneficial effects of the present invention are as follows.

The graphene-carbon fiber combined gas diffusion layer provided by the present invention has the advantage of environmental protection in preparation, and the gas state evacuation is 99% less than that of carbon paper. The method is suitable for rapid roll-to-roll batch preparation, and has higher efficiency than the traditional flat-plate method for carbon paper.

The mechanical strength of the gas diffusion layer and the support layer thereof is greatly improved by more than 2 times, the support layer is improved by 1-2 orders of magnitude, and the thickness is reduced to ½-⅕ of that of commercial carbon paper. The thermal conductivity is improved by 2-5 times. The weight of the single sheet is reduced by 0.5 to 3 times relative to commercial carbon paper (SGL carbon paper GDL 22BC, 36BC, TORAY TGP-H-060, TGP-H-090, Japan).

The surface roughness of the graphene microporous layer is smaller, the loading of the catalyst is relatively less than that of commercial carbon paper, and the falling-off degree of the catalyst is reduced.

Due to the significant reduction in the thickness of the gas diffusion layer required for fuel cell chips, the energy and power density of the fuel cell are significantly improved. Compared with carbon paper and metal net, the gas diffusion layer has significantly improved tensile strength, and the energy density of metal-air batteries is improved and the service life thereof is prolonged.

Compared with graphene oxide (or reduced graphene oxide), the graphene provided by the present invention has better thermal conductivity, better electric conductivity, and higher crystal characteristics.

The time for high-temperature treatment of the support layer of the gas diffusion layer provided by the present invention is reduced, and the energy consumption is reduced. Not only the performance of the gas diffusion layer is improved, but also the cost is reduced.

BRIEF DESCRIPTION OF THE DRAWINGS

FIGS. 1A-1B are schematic cross-sectional views of a graphene-carbon fiber gas diffusion layer, wherein FIG. 1A: a support layer of the gas diffusion layer formed by combining a carbon fiber filament and graphene, which has a gradually decreasing pore diameter and a gradually decreasing filament density; FIG. 1B: a graphene microporous layer.

FIGS. 3A-3B are optical micrograph pictures of an ultra-thin gaseous porous carbon material combined by graphene-carbon fiber filament.

FIGS. 4A-4C are scanning electron microscope SEM pictures of a monofilament layer of graphene-carbon fiber filament, wherein FIGS. 4A-4B represent front-side pictures, and FIG. 4C represents a cross-sectional thickness picture.

DETAILED DESCRIPTION OF THE EMBODIMENTS

Figures 1A, 1B:
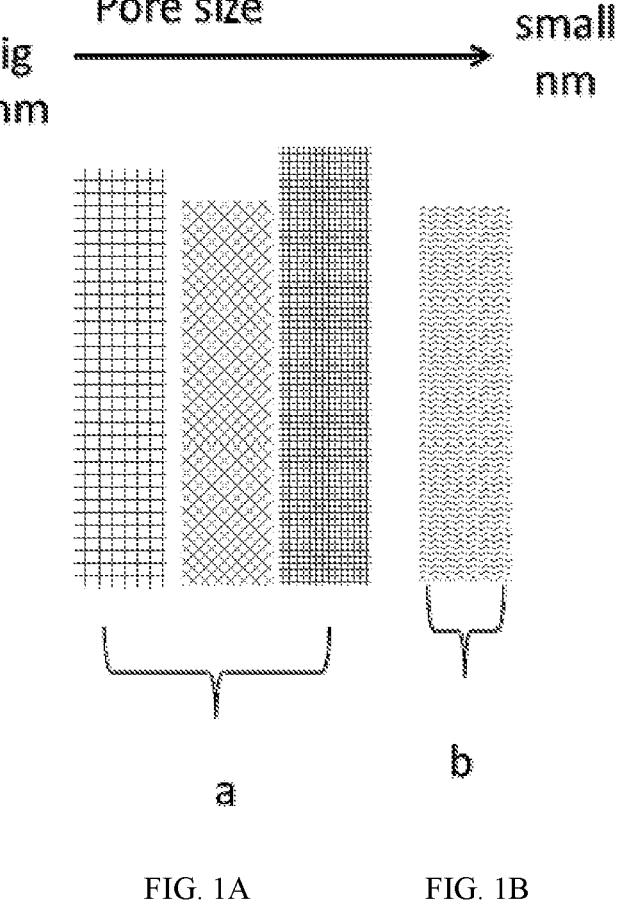

The present invention is described in detail below with reference to the accompanying drawings and the specific examples. However, the following examples are only for explaining the present invention, the protection scope of the present invention shall include the full contents of the claims, and the full contents of the claims of the present invention can be fully realized by those skilled in the art through the following descriptions of the examples.

Example 1

Preparation of large graphene. A flexible graphite paper was cut into paper strips (wherein the paper strip had a thickness of 0.5 mm, a width of 1.5 centimeters, and a length of 30 centimeters), and the paper strip was used as an electrode and inserted into an electrolyte. A distance between the graphite paper electrodes was 15 mm, the electrodes were separated by a polypropylene mesh (with square pores of 1.5×1.5 cm$^2$), and the ratio of electrolyte to graphite was 30 mL/g. The voltage of a direct current power supply was alternated from −5 V to +5 V. The electrolyte consisted of an aqueous solution of lithium perchlorate and dimethyl carbonate, wherein the concentration of the lithium perchlorate was 10 wt %, the content of water was 1 wt %, and the content of the dimethyl carbonate was 89 wt % (mass percentage, based on the total mass of the electrolyte). Programmed charging was performed for 144 h, and the charging direction was changed every 6 h at a temperature of 20° C. (the ratio of initial output current density to the area of graphite was 0.5 mA/cm$^2$). After the flexible graphite paper was electrolyzed and expanded, the electrolyte and the solid components of the expanded graphite were filtered and separated. The solid expanded graphite was put into a concentrated solution of sodium hydroxide (30 g/L), wherein the mass ratio of the expanded graphite was 2%, and the mixture was stirred for 2 h. Then solid-liquid separation was performed, the solid was washed with deionized water, the solid was filtered and collected, deionized water was added into the solid, and ultrasonic treatment was performed for 1 h to obtain an aqueous dispersion of the graphene (the dispersion concentration was 0.2 wt %). The dispersion was filtered with 100-mesh net film, and dispersion with a particle size less than or equal to 100 mesh remained. The water was added, the water was evaporated at 105° C., and the dispersion concentration of the graphene was adjusted to obtain an aqueous dispersion of the graphene (the dispersion concentration was 0.1-0.5 wt %), which was an aqueous slurry of large graphene and was used for preparing the gas diffusion layer. The large graphene has better electric conductivity than graphene oxide, and has a thermal conductivity of 500 W/m·K (measured by using a relaxation-resistant thermal conductivity instrument L467), which was higher than that of graphene oxide. The prepared graphene had no graphite 002 peak through XRD detection. Through detection of a projection electron microscope, the size of the two-dimensional nanosheet was greater than 100 square micrometers, and the electronic diffraction pattern had the graphene crystal characteristics of a lattice. According to the statistics of graphene edges under high-power projection electron microscopy, the atomic layers of graphene were between 1 and 5 layers.

Example 2

Preparation of large graphene. A graphite paper (having a thickness of 1 mm) was cut to form strips having a width of 1.2 cm, the strip was used as an electrode (with the surface resistance of about 2 ohms), a distance between the graphite paper electrodes was 20 mm, the electrodes were separated by polypropylene grids (having a pore diameter of 1 cm), and 3 rows of flexible graphite paper strips were inserted into an electrolyte. The direct current voltage was alternately at −6 V to +6 V, and the electrolyte was a solution composed of lithium perchlorate, dimethyl carbonate, 1,3-dimethylimidazole perchlorate, and water, wherein the concentration of lithium perchlorate was 8 wt %, the concentration of water was 0.3 wt %, the concentration of 1,3-dimethylimidazole perchlorate was 0.3 wt %, and the balance was dimethyl carbonate with a mass ratio of 91.4 wt %. Programmed charging was performed for 100 h, and the charging direction was changed every 4 h at a temperature of 20° C. (the ratio of initial output current density to the area of graphite paper was 1 mA/cm$^2$). After the flexible graphite paper was electrolyzed and expanded, the electrolyte and the solid components of the expanded graphite were filtered and separated. The solid expanded graphite was stirred in a concentrated solution of sodium hydroxide (20 g/L) for 6 h. Then solid-liquid separation was performed, the solid was washed with deionized water, the solid was filtered and collected, deionized water was added into the solid, then the ultrasonic treatment was performed for 2 h to obtain an aqueous dispersion of the large graphene, and a dispersed graphene aqueous slurry with a concentration of 1% (mass ratio) was prepared for the preparation of a support layer of a gas diffusion layer. The prepared graphene had no graphite 002 peak through XRD detection. Through the detection and statistics of the Raman spectrum to the sample, the ratio of the D/G peak was 0.5-0.8, and there were a small amount of defects. Through the detection of a projection electron microscope, the size of the two-dimensional nanosheet was greater than 100 square micrometers, and the electronic diffraction pattern had the graphene crystal characteristics of a lattice. According to the statistics of graphene edges under high-power projection electron microscopy, the number of the atomic layers of graphene was 1-5.

Example 3

Preparation of large nanosheet graphene slurry comprises the following steps: (1) the graphite film pressed by the vermicular graphite was used as an electrode, and the thickness of the single electrode was 2 mm; the graphite film was cut into comb-shaped strips having a width of 2 cm; (2) the electrolyte contained perchlorate ions having a concentration of 10 wt % and lithium ions having a concentration of 2 wt %, the solvent contained dimethyl carbonate (DMC) and water, wherein the water content was 0.2 wt %, ethylene carbonate (EC) content was 10 wt %, the content of 1-ethyl-3-methylimidazole perchloric acid ionic liquid was 0.2 wt %, and the balance was dimethyl carbonate; (3) the electrolysis conditions were that the voltage of a direct current power supply was charged by 5 V at a temperature of 10° C., and standing discharge was performed; the current direction was controlled by a software program to be positive current, standing and reverse current which were alternately performed, namely, the voltage was positively charged at 5 V for 6 h, standing was performed for 10 min, the voltage was reversely charged at 5 V for 6 h, standing was performed for 10 min, and the above processes were repeated for 12 times; and (4) filter pressing was performed after electrolysis, and electrolyte was recovered for recycling the electrolytic graphite film; then the electrolyte was soaked and stirred for 3 h by using an alkaline aqueous solution (a sodium hydroxide/lithium aqueous solution, the concentration of hydroxyl ions was 15 wt %), then filtering, stirring and washing were performed, washing with water was performed until the pH value was 10; and then ultrasonic dispersion was performed to a form large graphene aqueous slurry, wherein the concentration was controlled to be 0.1 wt % (between 0.1 wt % and 3 wt %). (%, both in mass percentage). The prepared graphene had no graphite 002 peak through XRD detection. Through the detection and statistics of the Raman spectrum to the sample, the ratio of the D/G peak was 0.3-0.7, and there were a small amount of defects. Through TEM detection of a projection electron microscope, the average size of the two-dimensional nanosheet was about 150 square micrometers, and the electron diffraction pattern had the characteristics of the crystal graphene of a typical graphene crystal lattice. According to the statistics of graphene edges under high-power projection electron microscopy, the number of the atomic layers of graphene was 1-5. The carbon content was 90-95% by EDX and XPS energy spectrum detection.

Example 4

Preparation of large nanosheet graphene slurry comprises the following steps: (1) the graphite film pressed by the vermicular graphite was used as an electrode, and the thickness of the single electrode was 2 mm; the graphite film was cut into comb-shaped strips having a width of 2 cm; (2) the electrolyte contained perchlorate ions having a concentration of 10 wt % and lithium ions having a concentration of 2 wt %, the solvent contained dimethyl carbonate (DMC), water, and 1-ethyl-3-methylimidazole perchloric acid ionic liquid, wherein the content of water was 1.0 wt %, the content of 1-ethyl-3-methylimidazole perchloric acid ionic liquid was 0.5 wt %, and the balance was dimethyl carbonate; (3) the electrolysis conditions were that the voltage of a direct current power supply was charged by 4 V at a temperature of 15° C., and standing discharge was performed; the current direction was controlled by a software program to be positive current, standing and reverse current which were alternately performed, namely, the voltage was positively charged at 4 V for 12 h, standing was performed for 10 min, the voltage was reversely charged at 4 V for 12 h, standing was performed for 10 min, and the above processes were repeated for 6 times; and (4) filter pressing was performed after electrolysis, and electrolyte was recovered for recycling the electrolytic graphite film; then the electrolyte was soaked and stirred by using an alkaline aqueous solution (a sodium hydroxide aqueous solution, the concentration of hydroxyl ions was 10 wt %), wherein the solid-liquid ratio was 30 mL/g. Then filtering, stirring and washing were performed, washing with water was performed until the pH value was 9; and then ultrasonic dispersion was performed for 3 h to form a large graphene aqueous slurry, and the solvent was water, wherein the concentration was controlled to be 1 wt %. (%, both in mass percentage). The prepared graphene had no graphite 002 peak through XRD detection. Through the detection and statistics of the Raman spectrum to the sample, the ratio of the D/G peak was 0.6-0.9, and there were defects. Through the detection of a projection electron microscope, the size of the two-dimensional nanosheet was greater than 60 square micrometers, and the electronic diffraction pattern had the graphene crystal characteristics of a lattice. According to the statistics of high-power projection electron microscopy to graphene edges, the number of the atomic layers of graphene was 1-5.

Example 5

Preparation of small graphene. 200 g of agate balls with a diameter of 0.6 cm, 10.0 g of ultrafine graphite (particles below 200 mesh) and 50 g of water were sealed in an agate ball mill jar. The ball mill jar was placed on a planetary ball mill, and ball milling was performed at 300 rpm/min for 20 h. After the ball milling was completed, the prepared graphene powder was poured into DMF, the dispersed concentration was 20 g/L, and the high-speed emulsification and shearing were performed for 8 h. Then, the mixture was poured into DMF with the dispersibility of graphene of 0.1 g/L, and the mixture was ultrasonically cleaned with an ultrasonic cleaner for 3 h. Then the mixture was filtered and dried to collect a graphene sample. The obtained graphene was small graphene and was used as a microporous layer of GDL. The prepared graphene had graphite 002 peak through XRD detection. Through the detection and statistics of the Raman spectrum to the sample, the ratio of the intensity of D peak to G peak was 0.2-0.6, and there were a small amount of defects. Through the detection of a projection electron microscope, the size of the two-dimensional nanosheet was less than 1 square micrometer, and the electronic diffraction pattern had the graphene crystal characteristics of a lattice. According to the statistics of graphene edges under high-power projection electron microscopy, the number of the atomic layers of graphene was 1-9.

Example 6

Preparation of small graphene. 200 g of agate balls with a diameter of 0.6 cm, 10.0 g of ultrafine graphite (particles below 200 mesh) and 50 g of water were sealed in an agate ball mill jar. The ball mill jar was placed on a planetary ball mill, and ball milling was performed at 300 rpm/min for 30 h. After the ball milling was completed, the prepared graphene powder was poured into water, the dispersed concentration was 10 g/L, and the high-speed emulsification and shearing were performed for 8 h. Then, the mixture was poured into the water with the dispersibility of graphene of 0.1 g/L, and the mixture was ultrasonically cleaned with an ultrasonic cleaner for 5 h. Then the mixture was filtered and dried to collect a graphene sample. The obtained graphene was small-size graphene, and was used for preparing a microporous layer of GDL and graphene with a void. The prepared graphene had graphite 002 weak peak through XRD detection. Through the detection and statistics of the Raman spectrum to the sample, the ratio of the D/G peak was 0.2-0.7. Through the detection and statistics of a scanning electron microscope and a projection electron microscope, the average size of the two-dimensional nanosheet was 0.7 square micrometers, and the electronic diffraction pattern had the graphene crystal characteristics of a lattice. According to the statistics of graphene edges under high-power projection electron microscopy, the number of the atomic layers of graphene was 1-9.

Example 7

Preparation of small graphene with a void. The dispersion concentration of small graphene (prepared from Example 5) in water was 5% (mass percentage) and the concentration of calcium ions ($Ca^{2+}$) ($CaCl_2$ reagent configuration) was 0.01 wt % (relative to the mass of water). 500 mL of an aqueous dispersion of small graphene and calcium ions was taken, dried at 80° C., then placed into a furnace for heating, and then argon with 5% $H_2$ was introduced, the heating rate was 10° C./min, the temperature was increased to 900° C., and this temperature was kept for 1 h. Then the mixture was soaked in 5 wt % of nitric acid solution for 2 h and centrifugally filtered, the solid was washed 6 times and collected, and the collected solid was dried at 80° C. Through the observation of a projection electron microscope, the graphene nanosheet was provided with voids, the size of the voids was 1-300 nanometers, and the graphene still had crystal characteristics. Through the test and statistics of the Raman spectrum, the intensity ratio of the D/G peak was 0.9-1.2, and the defects were significantly increased relative to small graphene.

Example 8

Preparation of large graphene with a void. Preparation of dispersions of large graphene (prepared from Example 2)

and small graphene (prepared from Example 6): the dispersion concentration of the large graphene in water was 1 wt %, the dispersion concentration of the small graphene in water was 4 wt % (mass percentage), the concentration of calcium chloride was 0.01 wt %, and the concentration of magnesium chloride was 0.02 wt % (relative to the mass of water). 500 mL of the graphene aqueous dispersion was taken, dried at 80° C., then placed into a furnace for heating, and then argon with 5% $H_2$ was introduced, the heating rate was 10° C./min, the temperature was increased to 900° C., and this temperature was kept for 1 h. Then the mixture was soaked in 3 wt % of nitric acid solution for 3 h and centrifugally filtered, the solid was washed 6 times and collected, and the collected solid was dried at 80° C. Through the observation of a projection electron microscope, the graphene nanosheet was provided with voids, the size of the voids was 1-500 nanometers, and the graphene still had crystal characteristics. Through the test and statistics of the Raman spectrum, the intensity ratio of the D/G peak was 1.0-1.4.

Example 9

Preparation and performance of a support layer of a gas diffusion layer. (1) Hydrophilic surface modification was firstly performed on a carbon fiber bundle (carbon fiber tow 12K (Zhongfu Shenying SYM30 12K)) with a length of 1 m, the carbon fiber bundle was soaked in 3 L of acetone at room temperature for 1 h to remove a sizing agent on the surface of the tow, then the bundle was heated in 2 L of 65 wt % concentrated nitric acid at the temperature of 80° C. for 24 h, and then the bundle was washed with water to remove residual nitric acid. Then the carbon fiber bundle was fixed in an unfolded manner, sodium cellulose aqueous solution (2 wt %) was dripped, then, the two sides were stretched, the water film was kept not to be broken, and after the stretching, the carbon fiber bundle was flatly placed on a nylon film net substrate (the nylon film net has a pore diameter of 50 meshes and a thickness of 100 micrometers) for supporting to form a carbon fiber monofilament layer supported by a net film. (2) Next, the large graphene slurry prepared in example (the large graphene slurry having a concentration of 0.1 wt % and prepared from Example 1) was sprayed on the carbon fiber monofilament layer supported by the net film at a room temperature spraying speed of 1 m/s for 10 s. The carbon fiber filaments were fixed and solidified through drying and heat treatment (at 80° C. for 12 h), and then the film filaments were subjected to rolling and cross-overlapping 5 times. Then the large graphene slurry (the large graphene paste having a concentration of 0.1 wt % and prepared from Example 1) was sprayed (at a spraying speed of 1 m/s for 10 s) to form a multi-layer support layer, and the support layer of the gas diffusion layer was formed by roll pressing (at a pressure of 8 MPa). The support layer was heated at 1000° C. for 1 h under the argon atmosphere, then placed in a graphitization furnace under the vacuum argon atmosphere, and heated for 30 min after the temperature was raised to 2500° C. A sample having an area of 40 cm×40 cm was taken, and the thickness of the support layer was measured to be 50 μm, the tensile strength was measured to be 3000 MPa, the porosity was measured to be 75%, the parallel thermal conductivity (dry state) was measured to be 30 W/(m·K), and the parallel resistivity was measured to be 2 mΩ·cm.

Example 10

Preparation and performance of a support layer of a gas diffusion layer. (1) Hydrophilic surface modification was firstly performed on a carbon fiber tow 24K (Zhongfu Shenying SYT49S 24K) with a length of 2 m, the carbon fiber bundle was soaked in acetone at room temperature for 1 h to remove a sizing agent on the surface of the tow, then the bundle was heated in 65 wt % concentrated nitric acid at the temperature of 80° C. for 24 h, and then the bundle was washed with water to remove residual nitric acid. Then the carbon fiber bundle was fixed in an unfolded manner, a mixed aqueous solution containing 0.1 wt % of polyacrylic acid and 0.1 wt % of polyvinyl alcohol (mass percentage) was dripped, the two sides were stretched, the water film was kept not to be broken, and after the stretching, the carbon fiber bundle was flatly placed on a fish net substrate for supporting to form a carbon fiber monofilament layer supported by a net film. (2) Next, the large graphene slurry prepared in example (the large graphene slurry having a concentration of 0.2 wt % and prepared from Example 2) was sprayed on the carbon fiber monofilament layer supported by the net film at a room temperature spraying speed of 10 m/s for 5 s. The carbon fiber filaments were fixed and solidified through drying and heat treatment (at 80° C. for 12 h), and then the film filaments were subjected to rolling and cross-overlapping 1 time. Then the large graphene slurry (the large graphene paste having a concentration of 0.2 wt % and prepared from Example 2) was sprayed (at a spraying speed of 10 m/s for 5 s) to form a multi-layer support layer, and the support layer of the gas diffusion layer was formed by roll pressing (at a pressure of 10 MPa). The support layer was heated at 1000° C. for 1 h under the argon atmosphere, then placed in a graphitization furnace under the vacuum argon atmosphere, heated for 30 min after the temperature was raised to 2200° C., and subjected to roll pressing (9 MPa), and the support layer was collected. A sample (as shown in FIGS. 3A-3B) having an area of 10 cm×10 cm was taken, and the thickness of the support layer was measured to be 15 μm, the tensile strength was measured to be 1000 MPa, the porosity was measured to be 78%, the parallel thermal conductivity (dry state) was measured to be 80 W/(m·K), and the parallel resistivity was measured to be 5 mΩ·cm.

Example 11

Preparation of a support layer of a gas diffusion layer. (1) Hydrophilic surface modification was firstly performed on a carbon fiber bundle (carbon fiber tow 12K (Zhongfu Shenying SYM30 12K)) with a length of 1 m, the carbon fiber bundle was soaked in 3 L of acetone at room temperature for 1 h to remove a sizing agent on the surface of the tow, then the bundle was heated in 2 L of 65 wt % concentrated nitric acid at the temperature of 80° C. for 24 h, and then the bundle was washed with water to remove residual nitric acid. Then the carbon fiber bundle was fixed in an unfolded manner, sodium cellulose aqueous solution (1 wt %) was dripped, then, the two sides were stretched, the water film was kept not to be broken, and after the stretching, the carbon fiber bundle was flatly placed on a nylon film net substrate (the nylon film net has a pore diameter of 50 meshes and a thickness of 50 micrometers) for supporting to form a carbon fiber monofilament layer supported by a net film. (2) Next, the large graphene slurry prepared in example (the large graphene slurry having a concentration of 0.2 wt %, see Example 1 for the preparation steps) was sprayed on the carbon fiber monofilament layer supported by the net film at a room temperature spraying speed of 1 m/s for 10 s. The carbon fiber filaments were fixed and solidified through drying and heat treatment (at 80° C. for 12 h), and then the film filaments were subjected to rolling and cross-overlapping 4 times. Then the large graphene slurry (the large graphene slurry having a concentration of 0.2 wt %, see Example 1 for the preparation steps) was sprayed (at a spraying speed of 1 m/s for 10 s, and the spraying speed and the spraying time were adjustable), and the carbon fiber filaments were heated at 1000° C. for 1 h under the argon atmosphere, then placed in a graphitization furnace under the vacuum argon atmosphere, and heated for 30 min after the temperature was raised to 2500° C. After the heat treatment, the support layer of the gas diffusion layer was formed by roll pressing (at a pressure of 8 MPa).

Example 12

Preparation of a porous conductive carbon layer compounded by graphene and carbon fiber. (1) Hydrophilic surface modification was firstly performed on a carbon fiber tow 24K (Zhongfu Shenying SYT49S 12K) with a length of 1 m, the carbon fiber bundle was soaked in 1 L of acetone at room temperature for 1 h to remove a sizing agent on the surface of the tow, then the bundle was heated in 1 L of 65 wt % concentrated nitric acid at the temperature of 80° C. for 24 h, and then the bundle was washed with water to remove residual nitric acid. Then the carbon fiber bundle was fixed in an unfolded manner, a mixed aqueous solution containing 2 wt % of polyacrylic acid and 1 wt % of polyvinyl alcohol (mass percentage) was dripped, the two sides were stretched, the water film was kept not to be broken, and after the stretching, the carbon fiber bundle was flatly placed on a nylon net substrate (with a pore diameter of 0.5 mm) for supporting to form a carbon fiber monofilament layer (the area of the monofilament layer was adjustable) supported by a net film. (2) Next, the large graphene slurry prepared from Example 2 (the large graphene slurry having a concentration of 2 wt % and prepared from Example 2) was sprayed on the carbon fiber monofilament layer supported by the net film at a room temperature spraying speed of 10 m/s for 10 s. The carbon fiber filaments were fixed and solidified through drying and heat treatment (at 80° C. for 12 h), and then the film filaments were subjected to rolling and cross-overlapping, then the large graphene slurry (the large graphene paste having a concentration of 2 wt % and prepared from Example 2) was sprayed (at a spraying speed of 10 m/s for 5 s) to form a multi-layer support layer, the overlapping was performed 10 times, and the porous compounded carbon layer was formed by roll pressing (at a pressure of 10 MPa). The support layer was heated at 1000° C. for 1 h under the argon atmosphere, then placed in a graphitization furnace under the vacuum argon atmosphere, heated for 30 min after the temperature was raised to 2500° C., and subjected to roll pressing (9 MPa), and the conductive carbon layer was collected.

Example 13

A porous and air-permeable conductive carbon material layer formed by combining a carbon fiber and graphene, wherein single filament of carbon fiber monofilament had a length of 5 micrometers and a tensile strength of 3.5 GPa, and the preparation conditions were the same as those in Example 12. Through testing, the conductive carbon material layer had a porosity of 71% (Beijing Zhongke Huiyu HYA2010-B2), and a parallel resistivity of 18 mΩ·cm (Double electric test four-probe tester RTS-9, Guangzhou 4Probes Tech Ltd.); the gas diffusion layer had a thermal conductivity of about 100 W/m·K (NETZSCH L467), and a thickness of 90 micrometers. The thermal conductivity was superior to that of commercial carbon paper (SGL carbon paper GDL 22BC, 39BC, 36BC, TORAY TGP-H-060, TGP-H-090, Japan).

Example 14

A gas diffusion layer (prepared from Example 41) formed by combining a carbon fiber (Zhongfu Shenying SYT49S 24K) and graphene, wherein the monofilament had an average diameter of 5 micrometers and a tensile strength of 3.8 GPa, and the gas diffusion layer was a porous and air-permeable conductive carbon material layer formed by compounding the monofilaments with the graphene. Through testing, the conductive carbon material layer had a porosity of 75% (Beijing Zhongke Huiyu HYA2010-B2), and a parallel resistivity of 2 mΩ·cm (Double electric test four-probe tester RTS-9, Guangzhou 4Probes Tech Ltd.); the gas diffusion layer had a thermal conductivity of 90 W/m·K (NETZSCH L467), and a thickness of 150 micrometers. The performance was superior to that of commercial carbon paper (a certain brand in Taiwan).

Example 15

A gas diffusion layer compounded by a carbon fiber and graphene was made of an air-permeable porous material formed by carbon fiber filaments (Zhongfu Shenying SYM40 12K) and graphene. The graphene in this material sample contained three types of graphene: large graphene (prepared from Example 2), small graphene (prepared from Example 5) and graphene with a void (prepared from Example 7), and the gas diffusion layer was prepared as in Example 42. The large graphene was of 1-5 graphene atomic layers, and the nanosheet has a length and a width more than 10 micrometers; the small graphene was of 1-9 graphene atomic layers, and graphene nanosheet had a length and a width less than 1 micrometer; the graphene with the void referred to that the graphene nanosheet had a void with a size of 1-300 nanometers, and the microporous layer contained the graphene with the void. The gas diffusion layer was coated with a commercial platinum-carbon catalyst (a certain brand in China), and hydrogen was produced by electrolyzing water (0.5 M sulfuric acid solution). The current density per unit area of the electrode was 20% higher than that of carbon paper GDL 22BC.

Example 16

A support layer of a gas diffusion layer compounded by carbon fiber and graphene, wherein a ratio (mass ratio) of carbon fiber (Zhongfu Shenying SYT49S 24K) to large graphene (prepared from Example 1) was 2 (see Example 11 for preparation process step of the support layer). The large graphene was of 1-5 graphene atomic layers, the microscopic area of the single nanosheet graphene was greater than 15 square micrometers, the diameter of the carbon fiber was 5 micrometers, and the tensile strength was 4.9 GPa; the prepared support layer had a tensile strength of 120 Mpa, a porosity of 72% and a parallel resistivity of 11.2 mΩ·cm, and can be stretched roll-to-roll and transported in rolls.

Example 17

A gas diffusion layer formed by combining a carbon fiber with graphene, wherein single filaments of carbon fiber monofilaments had an average diameter of 5 micrometers and a tensile strength of 3.5-4.9 GPa, and a porous and air-permeable conductive carbon material layer was formed after the carbon fiber monofilaments and the graphene were compounded (the preparation process steps were the same as those in Example 42). Through testing, the conductive carbon material layer had a porosity of 71-76% (Beijing Zhongke Huiyu HYA2010-B2), and a parallel resistivity of 1-18 m$\Omega$·cm (Double electric test four-probe tester RTS-9, Guangzhou 4Probes Tech Ltd.). The gas diffusion layer (with a thickness of 120 micrometers) was applied to a fuel cell, a catalyst was coated with platinum carbon (the mass ratio of Pt was 20%), the gas transmission effect and the catalytic performance were both superior to those of a commercial gas diffusion layer (TORAY TGP-H-060, Japan), and the current density was improved by 20%.

Example 18

An electric-conducting and thermal-conducting carbon material combined by a carbon fiber filament and graphene, wherein the mass ratio of the graphene (prepared from Example 4) to the carbon fibers was 1.1 (the preparation process conditions were shown in Example 12, the area of a monofilament layer was enlarged by 10 times relative to an original tow), the film thickness was 50 micrometers, the tensile strength was measured (through a universal material testing machine) to be 150 Mpa, and the parallel thermal conductivity was 60.2 W/(m·K) (NETZSCH L467), and the monofilament layer can be stretched roll-to-roll and transported in rolls.

Example 19

The fuel cell performance of graphene-carbon fiber gas diffusion layer (prepared from Example 45) was compared with that of commercial carbon papers. The proton exchange membrane fuel cell was assembled, DuPont Nafion membrane and Hesen catalyst 20% Pt/C were used, the constant current was 800 mA/cm$^2$, and MEA active area was 25 cm$^2$. After 1000 h of durability testing, the performance of the polarization curve at high current density was reduced by 10%, which was 8% less than that of TORAY TGP-H-060 in Japan.

Example 20

A support layer of a gas diffusion layer formed by combining a carbon fiber with graphene, wherein the carbon fiber tow 12K (Zhongfu Shenying SYM30 12K) was used, single filaments of carbon fiber monofilaments had an average diameter of 7 micrometers and a tensile strength of 4.9 GPa, and the support layer of the porous and air-permeable gas diffusion layer was formed after the carbon fiber monofilaments and the graphene were compounded (the preparation process steps were the same as those in Example 45). In the preparation method for the support layer, the interfacial force of liquid (sodium carboxymethyl cellulose aqueous solution) and carbon fiber filaments were used for driving the carbon fiber bundle to split into and spread the filaments to form a network filament layer, the area of the carbon fiber bundle was enlarged by about 50 times, the width of the carbon fiber tow was enlarged from 1 cm to 1 m, and the length of the carbon fiber bundle was reduced by half.

Example 21

A support layer of a gas diffusion layer formed by combining a carbon fiber with large graphene, wherein the carbon fiber tow 12K (Zhongfu Shenying SYM30 12K) was used, single filaments of carbon fiber monofilaments had an average diameter of 7 micrometers and a tensile strength of 4.9 GPa, and the support layer of the porous and air-permeable gas diffusion layer was formed after the carbon fiber monofilaments and the large graphene (prepared from Example 1) were compounded (the preparation process steps were the same as those in Example 44). In the preparation method for the support layer, the interfacial force of liquid (sodium carboxymethyl cellulose aqueous solution) and carbon fiber filaments were used for driving the carbon fiber bundle to split into and spread the filaments to form a network filament layer, the area of the carbon fiber bundle was enlarged by about 80 times, the width of the carbon fiber tow was enlarged from 1 cm to 1.2 m, and the length of the carbon fiber bundle was reduced to about 80%.

Example 22

A gas diffusion layer formed by combining a carbon fiber and graphene (see Example 41 for preparation method), the material structurally comprised the carbon fibers and the graphene, the carbon fiber monofilaments with a diameter of 5 micrometers were compounded with the graphene to form a porous and air-permeable conductive carbon material layer with a porosity of 73%, and the porous and air-permeable conductive carbon material layer was applied to fuel cells, supported catalysts and supported gas-liquid-electricity transmission. The carbon fiber tows (12K) were spread on a water film and compounded with graphene, and then subjected to high temperature, surface treatment and other steps, so that the carbon fiber tows were electric-conductive and thermal-conductive, had a tensile strength of 120 MPa and were ultrathin (80 micrometers); and the carbon fiber tows were applied to hydrogen fuel cells, supported platinum-carbon catalysts, collected current, supported electrode gas reaction, and reacted with hydrogen and oxygen to generate water.

Example 23

A carbon fiber-graphene combined gas diffusion layer (see Example 47 for preparation method). The GDL EJ-NK-03 was cut into 5 cm×5 cm and coated with an iron-nitrogen-carbon nonmetal catalyst to prepare the zinc-air battery, and the specific preparation method was referred to J. Mater. Chem. A, 2019, 7, 1451-1458. After the battery was charged and discharged for 48 h, the voltage width was reduced by 9%, and the performance was improved relative to the carbon paper.

Example 24

A carbon fiber-graphene combined gas diffusion layer (see Example 44 for preparation method). The EJ-10 was cut into 5 cm×5 cm and coated with an iron-nitrogen-carbon nonmetal catalyst to prepare the zinc-air battery, and the specific preparation method was referred to J. Mater. Chem. A, 2019, 7, 1451-1458. After the battery was charged and discharged for 48 h, and the voltage width was reduced by 15%.

Example 25

A gas diffusion layer compounded by a carbon fiber filament and graphene (the preparation process steps were the same as those in Example 42), wherein the gas diffusion layer had a layered network air-permeable structure with pore diameters in gradient distribution, the pore diameters were in layered gradient distribution from millimeter (1-3 mm) to micrometer (1-500 micrometers) to nanometer (1-500 nm), the millimeter and micrometer pores were formed by compounding carbon fiber filaments and graphene, the nanometer pores were formed by graphene, a distance between the carbon fiber filaments and a density of the carbon fiber filament were in layered gradient distribution, a surface density of each layer of carbon fiber monofilaments ranged from 30 monofilaments to 600 monofilaments per square centimeter, layers were arranged unidirectionally, and the thickness between layers was 300 micrometers.

Example 26

A gas diffusion layer compounded by a carbon fiber filament and graphene (the preparation process steps were the same as those in Example 42), wherein the gas diffusion layer had a layered network air-permeable structure with pore diameters in gradient distribution, the pore diameters were in layered gradient distribution from millimeter (1-2 mm) to micrometer (1-500 micrometers) to nanometer (1-300 nm), the millimeter and micrometer pores were formed by compounding carbon fiber filaments and graphene, the nanometer pores were formed by graphene, a distance between the carbon fiber filaments ((the diameter of the filaments were 7 micrometers)) and a density of the carbon fiber filament were in layered gradient distribution, a surface density of each layer of carbon fiber monofilaments ranged from 20 monofilaments to 500 monofilaments per square centimeter, and the layers were arranged unidirectionally. The thickness of a monofilament layer composed of graphene and carbon fiber filaments were 7-10 micrometers, the thickness of a gas diffusion layer formed by cross-overlapping the monofilament layers was 200 micrometers, and the thickness of a graphene microporous layer was 12 micrometers.

Example 27

A gas diffusion layer formed by combining carbon fiber and graphene (the preparation process steps were the same as those in Example 42), wherein the structure composition was mainly formed by compounding carbon fiber monofilaments (with a diameter of 7 micrometers) and graphene to form a porous and air-permeable conductive carbon material layer with a porosity greater than or equal to 70%, which supported the catalytic reaction of catalyst (Pt/C, metal-nitrogen-carbon) and involved gases (such as hydrogen and oxygen), supported gas-liquid-electricity mass energy transmission, and was applied to fuel cells, metal-air (zinc-air battery) batteries and electrolyzed water (0.5 M $H_2SO_4$); the performance was improved relative to that of commercial carbon paper, and the current density was improved by more than 10%, specifically, the current density of the electrode of a hydrogen fuel cell was improved by 15%, the zinc-air battery was improved by 12%, and the electrolyzed water was improved by 11%.

Example 28

A gas diffusion layer composed of graphene and a carbon fiber filament (the preparation process steps were the same as those in Example 43), wherein the gas diffusion layer had a porosity of 73%, supported the catalytic reaction of catalyst (Pt/C) and involved gases (such as hydrogen and oxygen), supported gas-liquid-electricity mass energy transmission, and was applied to fuel cells, metal-air batteries and electrolyzed water; the performance was improved relative to that of commercial carbon paper, and the current density of the electrode was improved by more than 15%, specifically, the current density of the electrode of a hydrogen fuel cell was improved by 18%, the zinc-air battery was improved by 16%, and the electrolyzed water was improved by 15%.

Example 29

The liquid (0.11 wt % of polyvinyl alcohol aqueous solution) soaked the surface of the carbon fiber filament (12K) under the interfacial force of the liquid and the carbon fiber filament, the liquid and the surface chemical functional groups of the filament had a polar adsorption effect, the carbon fiber bundle was driven to split into and spread the filament to form a network filament layer, the area of the carbon fiber bundle was expanded by about 28 times, and the carbon fiber tow was expanded to a monofilament layer with an area of 0.3 square meters from a 1-meter-long tow and a 1-centimeter-wide tow.

Example 30

A method for splitting a fiber tow into filaments, wherein the filaments were split by the extension of the liquid film, and the liquid film spread the tows to form a filament-containing liquid film and a filament network structure. The area of the filament network spread was more than 10 times that of the original filament tow. 3K carbon fiber filaments (with a diameter of 7 micrometers, a width of 1 centimeter and a length of 0.5 meters) were soaked in a mixed aqueous solution of polyacrylic acid (0.1%, mass ratio) and polyvinyl alcohol (0.1%, mass ratio), and then an aqueous liquid film was spread, wherein the film contained the carbon fiber filaments, and the area of the liquid film was enlarged to 0.2 square meters.

Example 31

Large graphene nanosheet and film material thereof. The graphene had a two-dimensional facing area greater than or equal to 50 square micrometers and a thickness in 1-4 atomic carbon layers, wherein the content of carbon element was greater than or equal to 88 wt %. The graphene had the crystal characteristics, oxygen-containing chemical functional groups (—COOH, —OH) and a solid electrolyte interface containing carbon, oxygen and hydrogen, can be dispersed in water, ethanol and dimethylformamide DMF with the dispersion concentration of 0.3 wt %, 0.2 wt % and 0.1 wt % (mass percentage), respectively, and did not precipitate within 24 h. The graphene film can be sprayed and coated to form a film and a coating, and can be self-absorbed to form a film after dried; wherein the graphene film had a thickness of 2 micrometers, a tensile strength of 35 MPa, and a parallel resistivity of 0.5 Ω·cm.

Example 32

A liquid film containing carbon fiber filament, wherein the oxygen-containing hydrophilic functional groups (such as carboxyl and hydroxyl) on the surface of the carbon fiber tow (3K) and aqueous solution formed a liquid film, the upper and lower surfaces of the film surface of the liquid film were in contact with air, the initial thickness of the liquid film was 5 micrometers, and the components of the liquid film were sodium carboxymethyl cellulose aqueous solution (with the initial concentration of 0.1%, mass ratio) and the carbon fiber filament; the liquid film can be thinned by stretching and extending the carbon fiber tows, the liquid film received liquid permeation, the carbon fiber bundles or filaments were fused into the liquid film to be thickened or increased in the area, and the distance between the carbon fiber filaments can be synchronously increased along with the expansion of the area of the liquid film.

Example 33

A liquid film containing a carbon fiber filament, wherein oxygen-containing hydrophilic functional groups on the surfaces of carbon fiber tow (24K) and an aqueous solution formed a liquid film, the air was contacted with the upper and lower surfaces of the film surface of the liquid film, the initial viscosity of the liquid film was about 200 Pa·s, and the components of the liquid film were sodium carboxymethyl cellulose, polyvinyl alcohol, polyurethane, and carbon fiber filaments; the liquid film can receive water, the water was fused into the liquid film along the carbon fiber filaments, and the distance between the carbon fiber filaments can be synchronously increased along with the expansion of the area of the liquid film.

Example 34

A liquid film containing carbon fiber filaments, wherein oxygen-containing hydrophilic functional groups on the surface of a graphite tow (12K) and an aqueous solution formed a liquid film, the upper and lower surfaces of the film surface of the liquid film were in contact with air, and the initial components of the liquid film were 0.01 wt % of sodium carboxymethyl cellulose, 0.05 wt % of polyvinyl alcohol, 0.01 wt % of polyurethane, and 12K carbon fiber filaments; the liquid film can receive an aqueous solution (0.01 wt % polyacrylic acid), water was fused into the liquid film along the carbon fiber filaments, and the area of the liquid film was synchronously enlarged (in mass percentage) along with the increase of the distance between the carbon fiber filaments.

Example 35

A preparation method for a liquid film for splitting into filaments (the ratio was mass percentage) comprises the following steps: (1) the preparation of an aqueous solution, wherein the components of the aqueous solution comprised polymer sodium carboxymethyl cellulose (0.5 wt %), polyvinyl alcohol (0.2 wt %), and polyacrylic acid (0.1 wt %), a solvent was water, and the dispersion concentration of graphene was 0.1 wt %; (2) oxidation hydrophilicity of carbon fiber bundles (3K), wherein a sizing agent was removed, the carbon fiber bundles were electrochemically oxidized for 0.5 h in concentrated nitric acid (20 wt %) at 2 V; (3) the hydrophilic carbon fiber bundles were soaked in the solution for 1 h to filtrate the carbon fiber bundle filament in the solution, then the tows were flatly placed and straightened, and one end of the carbon fiber bundle was fixed; and (IV) the outer sides of the two sides of the carbon fiber bundle were clamped and stretched towards the two sides at a controlled speed (1 mm/s), the solution was continuously supplied to the liquid film, and the liquid film was kept to be not broken during the increase of the area, wherein the area was expanded from 100 square centimeters to 5300 square centimeters.

Example 36

A graphene-carbon fiber porous material for a gas diffusion layer comprised 88 wt % (mass ratio) of carbon element, 92 wt % of the sum of carbon and nitrogen elements, 3 of mass ratio of carbon fiber/graphene, and 71% of air permeability; the support layer was formed by compounding carbon fibers and large nanosheet graphene (prepared from Example 3) (the large nanosheet graphene was defined as that the two-dimensional facing area of graphene nanosheets was greater than or equal to 50 square micrometers, and the graphene was of 1-5 atomic layers), $70\pm10$ wt % of the large nanosheet graphene was located at the intersection point of carbon fiber filaments or adjacent filaments, the carbon fiber filaments were cross-overlapped, and the graphene was connected to the filaments; the carbon fiber filament-graphene support layer was provided with gradient pores, the pore diameter was gradually reduced, and the density of the single-layer carbon fiber filament was arranged unidirectionally from large to small; the microporous layer had a thickness of 10 micrometers and contained small graphene (source) (two-dimensional facing area of graphene nanosheets was less than or equal to 1 square micrometers), and the proportion of graphene (source) with voids in the microporous layer was 85% (mass ratio) (the preparation process steps were the same as those in Example 45).

Example 37

A graphene-carbon fiber porous material for a gas diffusion layer comprised 85 wt % (≥70 wt %, mass ratio) of carbon element, 91 wt % (≥90 wt %) of the sum of carbon and nitrogen elements, 4 (5-2) of mass ratio of carbon fiber/graphene, and 76% (≥70%) of air permeability; the support layer was formed by compounding carbon fibers and large nanosheet graphene (prepared from Example 6) (the large nanosheet graphene was defined as that the two-dimensional facing area of graphene nanosheets was greater than or equal to 50 square micrometers, and the graphene was of 1-7 atomic layers), 72 wt % (50-80 wt %) of the large nanosheet graphene was located at the intersection point of carbon fiber filaments or adjacent filaments, the carbon fiber filaments were cross-overlapped, and the graphene was connected to the filaments; the carbon fiber filament-graphene support layer was provided with gradient pores, the pore diameter was gradually reduced, and the density of the single-layer carbon fiber filament was arranged unidirectionally from large to small; the thickness of the microporous layer was 15 micrometers (≤20 micrometers), the two-dimensional facing area of small graphene (graphene nanosheet) was less than or equal to 1 square micrometer, and the proportion of the graphene with the void in the microporous layer was 85 wt % (≥60 wt %). (The preparation process steps were the same as those in Example 43)

Example 38

The microporous layer of the gas diffusion layer comprised large graphene (prepared from Example 1), small graphene (prepared from Example 6), and graphene with a void (prepared from Example 8); the ratio of the three graphenes in the microporous layer was as follows: The content of the graphene with the void was 71 wt % (controlled at 70-80 wt %), the content of large graphene was 10 wt % (controlled at 5-10 wt %), the content of small graphene was 19 wt % (controlled at 15-20 wt %), and the thickness of the microporous layer was 3 micrometers (controlled at 1-10 micrometers). The large graphene was characterized by 1-5 atomic layers, and the two-dimensional nanosheet had an area greater than or equal to 50 square micrometers; the small graphene was characterized by 1-9 atomic layers, and the two-dimensional nanosheet had an area of 0.1-1 square micrometers; the graphene with the void was both large graphene and small graphene with a void, and the average diameter of the void was 10±5 nanometers. (The preparation process steps were the same as those in Example 40)

Example 39

The graphene microporous layer comprised large graphene, small graphene, and graphene with a void; and the ratio of the three graphenes in the microporous layer was as follows: the content of the graphene with the void was 80 wt %, the content of the large graphene was 5 wt %, the content of the small graphene was 15 wt %, and the thickness of the microporous layer was 5 micrometers. (The preparation process steps were the same as those in Example 40)

Example 40

A preparation method for a graphene microporous layer comprises the following steps: preparing a slurry of the graphene with a void, a slurry of large graphene and a slurry of small graphene according to a proportion formula, wherein in the slurry, the content of the graphene with the void was 79 wt %, the content of the large graphene was 5 wt %, the content of the small graphene was 15 wt %, and the content of polyvinylidene fluoride PVDF was 1 wt %; solvent was water and ethanol in a volume ratio of 2/1. Then the slurry was sprayed on a support layer of the gas diffusion layer at a spraying speed of 5 m/s, and dried at the vacuum temperature of 90° C. The microporous layer was then compacted (10 MPa) to a thickness of 2 micrometers.

Example 41

A preparation method for a gas diffusion layer comprises the following process units: (1) preparation of large graphene (Examples 1 and 2), (2) filament split of a carbon fiber tow by spreading a liquid film, (3) compounding of a carbon fiber filament with graphene, (4) preparation of a graphene microporous layer (Examples 38 and 43), (5) programmed heat treatment, and (6) forming and surface strengthening.

Preparation of a gas diffusion layer. The carbon fiber tow (12K, TORAY, Japan) with a length of 1 m was soaked in acetone for 1 h, and the sizing agent was removed; the tow was oxidized in concentrated nitric acid (60 wt %), heated at 80° C. for 2 h, and washed 2 times with water. Preparation of polymer mixed aqueous solution A: 1.0 wt % of sodium carboxymethyl cellulose, and 1.0 wt % of waterborne polyurethane (Anhui Anda-Huatai New Material Co., Ltd., mass percentage, hereinafter the same below). The aqueous slurry B of the large graphene (prepared from Example 1) was prepared with a dispersion concentration of 0.2 wt %. The carbon fiber tows were fixed on a water-permeable base film (nylon net, 200-mesh pore diameter), fully wet in the solution A, and the speed and fineness (shower pores) of the A water mist were controlled at 5 L/min and 1 mm. Then the carbon fiber tows were spread to two sides, and a continuous filament-liquid film was kept when the filaments were split, wherein the area of the filament-liquid film was expanded to about 5000 square centimeters. Then B was sprayed at a spraying speed of 2 m/s for 5 s, the sample was dried at 80° C., and the graphene filament single layer C of the graphene-carbon fiber filament sample was collected. Then cross-overlapping was performed on the two monofilament layers C 3 times, the large graphene slurry B was blown and sprayed, dried and dehydrated to form a graphene layer D. D was compacted at room temperature (10 MPa). Next, the compacted D was placed into a furnace, heated at 1000° C. for 1 h under the protection of nitrogen, transferred into a graphitizing furnace, and heated for 30 min under the protection of argon at 2500±100° C. to obtain a support layer E of GDL. Preparation of a microporous layer solution F: The content of graphene with a void (prepared from Example 8) was 85 wt %, the content of large graphene (prepared from Example 2) was 5 wt %, the content of small graphene (prepared from Example 6) was 9 wt %, the content of polyvinylidene fluoride PVDF was 1 wt %, and the solvents were water and ethanol in a volume ratio of 1/1. Then the F was sprayed on the E at a spraying speed of 20 m/s, the E was dried at 90° C. in a vacuum to obtain G, and the G was compacted (10 MPa) to obtain a GDL product of the graphene-carbon fiber filament numbered as GDL-01.

Example 42

Preparation of a gas diffusion layer. The carbon fiber tow (24K, Hyosung, Korea) with a length of 1 m was soaked in acetone for 1 h, and the sizing agent was removed; the tow was subjected to electrochemical anodization in concentrated nitric acid (60 wt %) for 2 h, and washed 3 times with water. Preparation of polymer mixed aqueous solution A: 1.5 wt % of sodium carboxymethyl cellulose, 1.0 wt % of waterborne polyurethane (Anhui Anda-Huatai New Material Co., Ltd., mass percentage, hereinafter the same below). The aqueous slurry B of the large graphene (prepared from Example 2) was prepared with a dispersion concentration of 0.2 wt %. The carbon fiber tows were fixed on a water-permeable base film (polypropylene net, 200-mesh pore diameter), fully wet in the solution A, and the speed and fineness of the A water mist were controlled at 3 L/min and 1 mm. Then the carbon fiber tows were extended and spread to two sides, and a continuous solid-liquid film was kept when the filaments were split, wherein the area of the solid-liquid film was expanded to about 8000 square centimeters. Next, the water was sprayed three times at a speed of 5 m/s for 5 s, B was sprayed at a speed of 5 m/s for 5 s, the sample was dried at 80° C., and the graphene filament single layer C of the graphene-carbon fiber filament sample was collected. Then cross-overlapping was performed on the monofilament layers C 4 times, the large graphene slurry B was blown and sprayed, dried and dehydrated to form a graphene layer D. D was compacted at room temperature (10 MPa). Next, the compacted D was placed into a furnace, heated at 1100° C. for 1 h under the protection of nitrogen, transferred into a graphitizing furnace, and heated for 30 min under the protection of argon at 2600±50° C. to obtain a support layer E of GDL. Preparation of a microporous layer solution F: the content of graphene with a void (prepared from Example 7) was 83 wt %, the content of large graphene (prepared from Example 2) was 5 wt %, the content of small graphene (prepared from Example 5) was 9 wt %, the content of polyvinylidene fluoride PVDF was 3 wt %, and the solvent was water. F was then sprayed onto the E at a spraying speed of 15 m/s, and E was dried at 90° C. in a vacuum to obtain G. The G was compacted (10 MPa) to obtain a GDL product of the graphene-carbon fiber filament numbered as GDL-02.

Example 43

Preparation of gas diffusion layers and coils thereof. The carbon fiber tow roll (24K, Hyosung, Korea) was unrolled and soaked in an acetone tank for 20 min, and a sizing agent was removed; the roll was put into an electrolytic tank, wherein the tank was filled with concentrated nitric acid (60 wt %) as the electrolyte, then put into a water tank after electrochemical anodic oxidation was performed for 2 h, and washed with water 3 times. Preparation of polymer mixed aqueous solution A: 1.5 wt % of sodium carboxymethyl cellulose (mass percentage, hereinafter the same below), 2.0 wt % of waterborne polyurethane (Anhui Anda-Huatai New Material Co., Ltd.). The aqueous slurry B of the large graphene (prepared from Example 2) was prepared with a dispersion concentration of 0.5 wt %. The carbon fiber tows were fixed on a water-permeable base film roll (polypropylene net, 100-mesh pore diameter), fully wet in the solution A, and the speed and fineness of the A water mist were controlled at 4 L/min and 1 mm. Then the carbon fiber tows were extended and spread to two sides, and a continuous solid-liquid film was kept when the filaments were split, wherein the width of the solid-liquid film was expanded to about 80 centimeters. Next, the water was sprayed three times at a speed of 5 m/s for 5 s, B was sprayed at a speed of 5 m/s for 5 s, the sample was dried at 80° C., and the graphene filament single layer C of the graphene-carbon fiber filament supported by the base film was rolled. Then the graphene filament single layer was unrolled to separate from the base film, then cross-overlapping was performed on the monofilament layers C 5 times, the large graphene slurry B was blown and sprayed (Example 2), dried and dehydrated to form a graphene layer D. The D was rolled at room temperature (8 MPa), and DJ was coiled and uncoiled. Next, the compacted DJ was placed into a furnace, heated at 1100° C. for 1 h under the protection of nitrogen, transferred into a graphitizing furnace, and heated for 30 min under the protection of argon at 2600° C. to obtain a support layer EJ of GDL. Preparation of a microporous layer slurry F: the content of graphene with a void (prepared from Example 8) was 90 wt %, the content of large nanosheet graphene (prepared from Example 3) was 3 wt %, the content of small graphene (prepared from Example 6) was 4 wt %, the content of polyvinylidene fluoride PVDF was 3 wt %, and the solvent was water. Then F was sprayed on the uncoiled EJ at a spraying speed of 30 m/s, meanwhile, the EJ was continuously coiled and uncoiled, F was continuously sprayed, and the EJ was dried for 5 h at the vacuum temperature of 90° C. to obtain coiled GJ. The GJ was rolled and compacted (8 MPa) to obtain a GDL product of the graphene-carbon fiber filament numbered as GDL-01J.

Example 44

Preparation of an ultrathin support layer of a gas diffusion layer formed by combining a carbon fiber with large graphene. The carbon fiber tow coils and uncoiled tow 12K (Zhongfu Shenying SYM30 12K, wherein single filaments of carbon fiber monofilaments had an average diameter of 7 micrometers and a tensile strength of 4.9 GPa), an acetone tank, a nitric acid electrolytic tank, and 3 water tanks were prepared. Preparation of polymer mixed aqueous solution A:

1.5% of sodium carboxymethyl cellulose (mass percentage, hereinafter the same below), 2.0 wt % of waterborne polyurethane (Anhui Anda-Huatai New Material Co., Ltd.). Large graphene slurry B (prepared from Example 1) was prepared, wherein the dispersibility of large graphene (1-5 atomic layers, with the length and width of the nanosheet being greater than 10 micrometers) in water was 1.0 wt % (mass percentage). The carbon fiber tows were coiled and uncoiled, sequentially passed through a carbon fiber tow acetone tank, a nitric acid electrolytic tank, and a water tank, and suspended and fixed on a water-permeable film roll (a polypropylene net with a pore diameter of 100 meshes) on the water tank. Then the carbon fiber tows were fully wet in the solution A, and the speed and fineness of the A water mist were controlled at 2 L/min and 1 mm. Then the carbon fiber tows were slowly extended to two sides and spread, and a continuous solid-liquid film was kept when the filaments were split, wherein the width of the solid-liquid film was expanded to about 80 centimeters. Next, the water was sprayed three times at a speed of 5 m/s for 5 s, B was sprayed at a speed of 5 m/s for 5 s, the sample was dried at 80° C., and the graphene filament single layer C of the graphene-carbon fiber filament supported by the base film was rolled. Then the graphene filament single layer was unrolled to separate from the base film, then cross-overlapping was performed on the monofilament layers C 1 time, the large graphene slurry B was blown and sprayed at a spraying speed of 5 m/s for 3 s, dried and dehydrated to form a graphene layer D. The D was rolled at room temperature (8 MPa), and DJ was coiled and uncoiled. Next, the compacted DJ was placed into a furnace, heated at 1100° C. for 1 h under the protection of nitrogen, transferred into a graphitizing furnace, and heated for 30 min under the protection of argon at 2600±50° C. to obtain a support layer EJ-10 of GDL. The thickness of the support layer EJ-10 was 11 micrometers as measured by a thickness tester (as shown in FIGS. 4A-4C).

Example 45

Preparation of a support layer of a gas diffusion layer formed by combining a carbon fiber with large graphene and coil thereof. The carbon fiber tow coils and uncoiled tow (24K, Hyosung, Korea), an acetone tank, a nitric acid electrolytic tank, and 3 water tanks were prepared. Preparation of polymer mixed aqueous solution A: 1.5 wt % of sodium carboxymethyl cellulose, 2.0 wt % of waterborne polyurethane (mass percentage, hereinafter the same below). Large graphene slurry B (prepared from Example 2) was prepared, wherein the dispersibility of large graphene (1-5 atomic layers, with the length and width of the nanosheet being greater than 10 micrometers) in water was 1.0 wt % (mass percentage). The carbon fiber tows were coiled and uncoiled, sequentially passed through a carbon fiber tow acetone tank, a nitric acid electrolytic tank, and a water tank, and suspended and fixed on a water-permeable film roll (a polypropylene net with a pore diameter of 100 meshes) on the water tank. Then the carbon fiber tows were fully wet in the solution A, and the speed and fineness of the A water mist were controlled at 3 L/min and 1 mm. Then the carbon fiber tows were slowly extended to two sides and spread, and a continuous filament-liquid film was kept when the filaments were split, wherein the width of the filament-liquid film was expanded to about 90 centimeters. Next, the water was sprayed three times at a speed of 5 m/s for 5 s, B was sprayed at a speed of 5 m/s for 5 s, the sample was dried at 80° C., and the graphene filament single layer C of the graphene-carbon fiber filament supported by the base film was rolled. Then the graphene filament single layer was unrolled to separate from the base film, then cross-overlapping was performed on the monofilament layers C 4 times, and the large graphene slurry B was blown and sprayed at a spraying speed of 5 m/s for 3 s. The large graphene slurry B was dried and dehydrated to form a graphene layer D. The D was rolled at room temperature (8 MPa), and DJ was coiled and uncoiled. Next, the compacted DJ was placed into a furnace, heated at 1100° C. for 1 h under the protection of nitrogen, transferred into a graphitizing furnace, and heated for 30 min under the protection of argon at 2600±50° C. to obtain a support layer coil EJ-11 of GDL.

Example 46

Preparation of a support layer of gradient pores of a gas diffusion layer formed by combining a carbon fiber with large graphene and coil thereof. The carbon fiber tow coils and uncoiled tow (3K, 9K, 24K), an acetone tank, a nitric acid electrolytic tank, and 4 water tanks were prepared. Preparation of polymer mixed aqueous solution A: 1.5 wt % of sodium carboxymethyl cellulose, 0.02 wt % of polyvinyl alcohol (mass percentage, hereinafter the same below). Large nanosheet graphene slurry B2 (prepared from Example 3) was prepared, wherein the dispersibility of large graphene (1-5 atomic layers, with the length and width of the nanosheet being greater than 10 micrometers) in water was 0.5 wt %. The carbon fiber tows were coiled and uncoiled, sequentially passed through a carbon fiber tow acetone tank, a nitric acid electrolytic tank, and a water tank, soaked in acetone for 10 min, and subjected to electrolytic oxidation at 3 V for 20 min. The carbon fiber tows were suspended and fixed on a water-permeable film roll (nylon net with a pore diameter of 100 meshes) in a water tank. Then the carbon fiber tows were fully wet in the solution A, and the speed and fineness of the A water mist were controlled at 3 L/min and 1 mm. Then the carbon fiber tows were slowly extended to two sides and spread, and a continuous filament-liquid film was kept when the filaments were split, wherein the width of the filament-liquid film was expanded to about 90 centimeters. Next, the water was sprayed three times at a speed of 5 m/s for 5 s, B was sprayed at a speed of 10 m/s for 4 s, the sample was dried at 80° C., and the graphene filament single layer C of the graphene-carbon fiber filament supported by the base film was rolled. The resulting C for the 3K, 9K and 24K tows were C-3K, C-9K and C-12K, respectively. Then the monofilament layer C-12K was unrolled to separate from the base film and subjected to cross-overlapping 1 time, the large nanosheet graphene slurry B2 was blown and sprayed at a spraying speed of 5 m/s for 3 s to obtain C-12K+; then C-12K+ was cross-overlapped with C-9K, and the graphene slurry was sprayed to form C-12K+C-9K+; and C-12K+C-9K+ was cross-overlapped with C-3K to form C-12K+C-9K+C3K. The filaments had different surface densities and pore diameters, forming interlayer gradient pores. The large graphene slurry B was dried and dehydrated to form a graphene layer D. The D was rolled at room temperature (8 MPa), and DJ was coiled and uncoiled. Next, the compacted DJ was placed into a furnace, heated at 1100° C. for 1 h under the protection of nitrogen, transferred into a graphitizing furnace, and heated for 30 min under the protection of argon at 2600±50° C. to obtain a support layer coil EJ-NK-01 of GDL.

Example 47

Preparation of a support layer of gradient pores of a gas diffusion layer formed by combining a carbon fiber with large graphene and coil thereof. The carbon fiber tow coils and uncoiled tow (3K, 9K, 24K), an acetone tank, a nitric acid electrolytic tank, and 4 water tanks were prepared. Preparation of polymer mixed aqueous solution A: 1.5 wt % of sodium carboxymethyl cellulose, 0.02 wt % of polyvinyl alcohol (mass percentage, hereinafter the same below). Large nanosheet graphene slurry B (prepared from Example 4) was prepared, wherein the dispersibility of large graphene (1-5 atomic layers, with the length and width of the nanosheet being greater than 10 micrometers) in water was 0.5 wt %. The carbon fiber tows were coiled and uncoiled, sequentially passed through a carbon fiber tow acetone tank, a nitric acid electrolytic tank, and a water tank, soaked in acetone for 10 min, and subjected to electrolytic oxidation at 3 V for 20 min. The carbon fiber tows were suspended and fixed on a water-permeable film roll (nylon net with a pore diameter of 100 meshes) in a water tank. Then the carbon fiber tows were fully wet in the solution A, and the speed and fineness of the A water mist were controlled at 3 L/min and 1 mm. Then the carbon fiber tows were slowly extended to two sides and spread, and a continuous filament-liquid film was kept when the filaments were split, wherein the width of the filament-liquid film was expanded to about 30-90 centimeters (3K with a width of 60 centimeters, 9K with a width of 90 centimeters, and 12K with a width of 30 centimeters), and the difference between the surface density of the filaments and the distance or pore diameter of the filaments were significant. Next, the water was sprayed three times at a speed of 5 m/s for 5 s, B was sprayed at a speed of 10 m/s for 4 s, the sample was dried at 80° C., and the graphene filament single layer C of the graphene-carbon fiber filament supported by the base film was rolled. The resulting C for the 3K, 9K and 24K tows were C-3K, C-9K and C-12K, respectively. Then the monofilament layer C-12K was unrolled to separate from the base film and subjected to cross-overlapping 1 time, the large nanosheet graphene slurry B was blown and sprayed at a spraying speed of 5 m/s for 3 s to obtain C-12K+; then C-12K+ was cross-overlapped with C-9K, and the graphene slurry was sprayed to form C-12K+C-9K+; and C-12K+C-9K+ was cross-overlapped with C-3K to form C-12K+C-9K+C3K. The filaments had different surface densities and pore diameters, forming interlayer gradient pores. The large graphene slurry B was dried and dehydrated to form a graphene layer D. The D was rolled at room temperature (8 MPa), and DJ was coiled and uncoiled. Next, the compacted DJ was placed into a furnace, heated at 1100° C. for 1 h under the protection of nitrogen, transferred into a graphitizing furnace, and heated for 30 min under the protection of argon at 2600±50° C. to obtain a support layer coil EJ-NK-03 of GDL.

FIGS. 1A-1B are schematic cross-sectional views of a graphene-carbon fiber gas diffusion layer, wherein FIG. 1A: a support layer of the gas diffusion layer formed by combining a carbon fiber filament and graphene, which has a gradually decreasing pore diameter and a gradually decreasing filament density; FIG. 1B: a graphene microporous layer.

Figure 2:
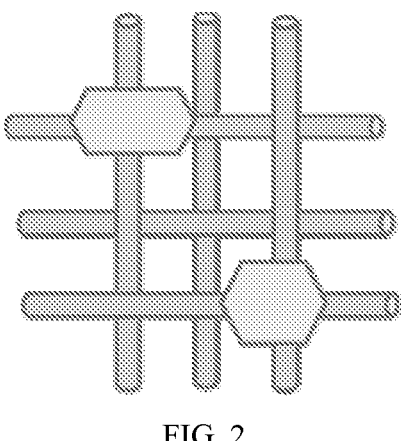
FIG. 2 is a schematic diagram of a single-layer support layer of the gas diffusion layer combined by graphene-carbon fiber filament, wherein the graphene is located at the intersection point (junction) of the carbon fiber filaments.

FIG. 2 is a schematic diagram of a single-layer support layer of the gas diffusion layer combined by graphene-carbon fiber filament, wherein the graphene is located at the intersection point (junction) of the carbon fiber filaments.

FIGS. 3A-3B are optical microscope (Example 10) pictures of a support layer of an ultrathin diffusion layer combined by graphene-carbon fiber filaments.

FIGS. 4A-4C are scanning electron microscope (Example 44) SEM pictures of a monofilament layer of graphene-carbon fiber filament, wherein FIGS. 4A-4B represent front-side pictures, and FIG. 4C represents a cross-sectional thickness picture.

It should be noted that those skilled in the art can fully implement the full scope as defined by the independent claims and the dependent claims of the present invention according to the above examples of the present invention, and implementation processes and methods are the same as the above examples; and a part that is not described in detail in the present invention belongs to the well-known technology in the art. The foregoing descriptions are merely some specific implementations of the present invention, but are not intended to limit the protection scope of the present invention. Any variation or replacement readily figured out by those skilled in the art within the technical scope disclosed in the present invention shall fall within the protection scope of the present invention.

The invention claimed is:

1. A gas diffusion layer formed by combining a carbon fiber and graphene, comprising a porous and air-permeable conductive carbon material layer formed by compounding a carbon fiber monofilament with graphene and having a porosity of greater than or equal to 70%; wherein the conductive carbon material layer comprises a support layer and a microporous layer on the support layer; the support layer comprises a porous material layer formed by compounding the carbon fiber monofilament with large graphene, the large graphene is of 1-5 graphene atomic layers, and single nanosheet graphene has an area greater than 50 square micrometers; the carbon fiber monofilament has a diameter of 5-7 micrometers and a length greater than 10 centimeters;

a method for preparing the gas diffusion layer comprises:

splitting a tow into filaments by spreading a liquid film to form a liquid film for infiltrating the filaments, wherein the filaments and the filaments form a network infiltrated and covered by the liquid film, and an area of filament-liquid film is enlarged to more than 10 times relative to that of the tow;

an oxygen-containing hydrophilic functional group on a surface of a carbon fiber filament is compatible with an aqueous solution to form a solid-liquid film, the solid-liquid film has a thickness of 0.5-500 micrometers, and two sides of a film surface of the solid-liquid film are in contact with air; a liquid film is formed between the carbon fiber filaments has a viscosity of 1.7-1000 Pa·s; the solid-liquid film is expanded by more than 10 times, an area of the liquid film is expanded by receiving a liquid, and a distance between the carbon fiber filaments is synchronously increased along with an expansion of the area of the liquid film;

a method for preparing the liquid film comprises the following steps: (1) preparing a solution, wherein components of the solution comprise polymers, a solvent is water, a total mass percentage concentration of the polymers is 0.1-5%, and the polymers are 1-4 of sodium carboxymethyl cellulose, polyvinyl alcohol, polyacrylic acid, and waterborne polyurethane; (2) performing oxidation hydrophilicity of carbon fiber bundles, removing a sizing agent, and then performing heat oxidation or electrochemical oxidation in concentrated nitric acid; (3) soaking the carbon fiber bundles in the solution on a water-permeable base film together, so as to infiltrate carbon fiber bundle filaments in the solution; and (4) stretching the carbon fiber bundles towards two sides at a controlled speed, supplying the solution to the liquid film, and keeping the area of the liquid film from being broken during an increase.

2. The gas diffusion layer according to claim 1, wherein the support layer is carbon fiber filaments absorbed and anchored with graphene, and an intersection point of the filaments covers the graphene to form a porous frame structure; and the support layer has a tensile strength greater than or equal to 100 Mpa and a porosity greater than or equal to 70%, and is stretched roll-to-roll and transported in rolls.

3. The gas diffusion layer according to claim 1, wherein the microporous layer is a layer formed from raw materials comprising the large graphene, small graphene, and graphene with a void; the small graphene is of 1-9 graphene atomic layers, and a length and a width of a single sheet of the small graphene are less than 1 micrometer; and the graphene with the void is provided with a void with a size of 1-300 nanometers on a surface of single-sheet graphene.

4. The gas diffusion layer according to claim 1, wherein the gas diffusion layer has a layered network air-permeable structure with pore diameters in gradient distribution, the pore diameters are in layered gradient distribution from millimeter to micrometer to nanometer, millimeter and micrometer pores are formed by compounding the carbon fiber filaments and graphene, nanometer pores are formed by graphene, the distance between the carbon fiber filaments and a density of the carbon fiber filament are in layered gradient distribution, a surface density of each layer of carbon fiber monofilaments ranges from 20 monofilaments to 500 monofilaments per square centimeter, and a surface density between layers is arranged unidirectionally from high to low.

5. The gas diffusion layer according to claim 1, wherein an interfacial force between the liquid and the carbon fiber filament in the support layer drives a carbon fiber bundle to split into and spread filaments to form a combined filament-to-filament network structure, an area of which is enlarged by more than 20 times relative to a carbon fiber tow.

6. The gas diffusion layer according to claim 1, wherein in the support layer, the large graphene has a crystal characteristic and a carbon element content greater than or equal to 88 wt %, has an oxygen-containing chemical functional group and a carbon-oxygen-hydrogen-containing solid electrolyte interface, and is dispersed in water, alcohol, and dimethylformamide (DMF) to form a slurry; the slurry is sprayed to form a film and a coating and is self-absorbed to form a film after dried; a method for preparing the large graphene comprises the following steps: (1) taking a graphite paper as an electrode, or taking a graphite film prepared from vermicular graphite as an electrode, wherein a single electrode has a thickness of 0.5-2 mm; cutting the graphite paper or the graphite film into comb-shaped strips, wherein each strip has a width of 1-3 cm; (2) electrifying by using an electrolyte to drive graphite to expand; (3) performing electrifying under conditions that a voltage of a direct current power supply is charged for 3-8 V, a temperature is 0-40° C., a software program controls a current to be positive current, standing, reverse current, and standing alternately performed; and (4) performing filter pressing after electrolysis, and recovering the electrolyte for recycling electrolytic graphite paper/film; then soaking and stirring with alkaline aqueous solution, filtering, stirring, washing, and washing with water to pH of 8-10; the electrolyte used for preparing the large graphene comprises perchlorate ions at a concentration of 5-10 wt % and lithium ions at a concentration of 1-5 wt %, a solvent comprises dimethyl carbonate (DMC) and water, a content of the water is 0.02-2 wt %, and a content of the DMC is greater than or equal to 50 wt %; the solvent further comprises at least one of ethylene carbonate (EC), diethyl carbonate (DEC), ethyl methyl carbonate (EMC), and an imidazolium perchlorate ionic liquid.

7. The gas diffusion layer according to claim 3, wherein the graphene with the void is prepared by the following steps: preparing an aqueous solution of metal ions, adding graphene to form a graphene dispersion; drying the dispersion, then putting a solid into a furnace for heating, introducing 5% of argon with hydrogen $H_2$, heating at a rate of 10° C./min to 900° C., and keeping a temperature at 900° C. for 1 h; then soaking a mixture in 3.0 wt % of nitric acid solution, filtering, centrifuging, washing with water, collecting a solid, and drying the solid at 80° C.; and the graphene dispersion is prepared: a dispersion concentration of graphene in water is 5 wt %, a concentration of calcium chloride is 0.01 wt %, and a concentration of magnesium chloride is 0.02 wt % relative to a mass of water.

8. A preparation method for the gas diffusion layer according to claim 1, comprising the following process units: preparation of the large graphene, filament split of a carbon fiber tow by spreading the liquid film, compounding of a carbon fiber filament with graphene, preparation of a graphene microporous layer, programmed heat treatment, and forming and surface strengthening.

9. The preparation method for the gas diffusion layer according to claim 8, wherein the compounding of the carbon fiber filament with the graphene comprises: spraying and drying a slurry of large graphene, and cross-overlapping and compacting two rolls of filament films; the programmed heat treatment comprises: heating at 900-1100° C. for 1-2 h, and heating at 2500±100° C. for 30 min in an argon atmosphere; and the forming and surface strengthening comprises: increasing hydrophobicity and bonding the microporous layer by using polyvinylidene fluoride (PVDF), and performing rolling or hot pressing.

* * * * *